(12) United States Patent
Clark

(10) Patent No.: US 9,440,313 B2
(45) Date of Patent: Sep. 13, 2016

(54) HARD DRIVE DATA DESTROYING DEVICE

(71) Applicant: Kevin P. Clark, Carbondale, IL (US)

(72) Inventor: Kevin P. Clark, Carbondale, IL (US)

(73) Assignee: Serenity Data Security, LLC, Carbondale, IL (US)

( * ) Notice: Subject to any disclaimer, the term of this patent is extended or adjusted under 35 U.S.C. 154(b) by 248 days.

(21) Appl. No.: 14/206,234

(22) Filed: Mar. 12, 2014

(65) Prior Publication Data

US 2014/0263216 A1    Sep. 18, 2014

Related U.S. Application Data

(60) Provisional application No. 61/777,091, filed on Mar. 12, 2013.

(51) Int. Cl.

| B23C 3/00 | (2006.01) |
|---|---|
| B23C 1/08 | (2006.01) |
| B23Q 3/06 | (2006.01) |
| B23Q 11/08 | (2006.01) |
| B23Q 11/00 | (2006.01) |
| B23B 51/04 | (2006.01) |

(Continued)

(52) U.S. Cl.
CPC ............... *B23K 26/382* (2015.10); *B23C 3/00* (2013.01); *B23K 26/127* (2013.01); *B23K 26/142* (2015.10); *B23K 26/384* (2015.10); *B23Q 3/069* (2013.01); *G11B 5/0245* (2013.01); *B23B 51/0426* (2013.01); *B23C 1/08* (2013.01); *B23K 2201/36* (2013.01); *B23Q 11/0046* (2013.01); *B23Q 11/0891* (2013.01); *B23Q 2230/002* (2013.01); *Y10T 408/03* (2015.01); *Y10T 408/45* (2015.01); *Y10T 408/56238* (2015.01); *Y10T 409/307* (2015.01); *Y10T 409/30392* (2015.01); *Y10T 409/300896* (2015.01); *Y10T 409/303752* (2015.01); *Y10T 409/304088* (2015.01); *Y10T 409/306944* (2015.01); *Y10T 409/307168* (2015.01); *Y10T 409/309016* (2015.01)

(58) Field of Classification Search
CPC ............ B23Q 2230/002; B23Q 3/069; Y10T 409/307; Y10T 409/306944; Y10T 408/8973; Y10T 408/56238
USPC ............................ 409/189, 188; 408/209, 96
See application file for complete search history.

(56) References Cited

U.S. PATENT DOCUMENTS

| 2,234,663 | A |   | 3/1941 | Anderegg |           |
|---|---|---|---|---|---|
| 2,980,151 | A | * | 4/1961 | Arbour ................. | B27B 5/12 |
|   |   |   |   |   | 144/23 |

(Continued)

FOREIGN PATENT DOCUMENTS

WO    WO2012137063    10/2012

OTHER PUBLICATIONS

Search Report, from PCT/US14/50523, mailed Jan. 6, 2015.

*Primary Examiner* — Erica E Cadugan

(74) *Attorney, Agent, or Firm* — Alix, Yale & Ristas, LLP

(57) ABSTRACT

Three systems for the destruction of the data storage portion of electronic media storage devices such as hard disk drives, solid state drives and hybrid hard drives. One system utilizes a mill cutter with which the hard drive has relative motion in the direction of the axis of the mill cutter to destroy the data storage portion. A second system utilizes a laser to physically destroy the data storage portion. The third system utilizes a chemical solvent to chemically destroy the data storage portion.

16 Claims, 38 Drawing Sheets

(51) Int. Cl.
  *B23K 26/12* (2014.01)
  *G11B 5/024* (2006.01)

(56) References Cited

U.S. PATENT DOCUMENTS

| | | | |
|---|---|---|---|
| 3,237,362 A | 3/1966 | Fromson | |
| 3,587,391 A * | 6/1971 | Pitts et al. | B23Q 1/40 |
| | | | 269/267 |
| 4,721,257 A | 1/1988 | Williams et al. | |
| 4,779,810 A | 10/1988 | Frey | |
| 4,880,065 A | 11/1989 | McDonald et al. | |
| 5,064,126 A | 11/1991 | Hickey et al. | |
| 5,203,067 A * | 4/1993 | DeFazio | B09B 5/00 |
| | | | 29/403.3 |
| 5,236,139 A | 8/1993 | Radtke | |
| 5,930,217 A | 7/1999 | Kayanuma | |
| 6,039,637 A | 3/2000 | Hutchison et al. | |
| 6,065,911 A * | 5/2000 | Almblad | B23C 3/35 |
| | | | 250/202 |
| 6,375,106 B1 | 4/2002 | Sears | |
| 6,478,515 B1 * | 11/2002 | Mueller | B44B 3/06 |
| | | | 269/309 |
| 6,588,691 B2 | 7/2003 | Yamamoto et al. | |
| 6,685,119 B2 | 2/2004 | Castronovo | |
| 6,695,240 B2 | 2/2004 | Rajewski | |
| 7,090,156 B2 | 8/2006 | Castronovo | |
| 7,090,214 B2 | 8/2006 | Castronovo | |
| 7,100,852 B2 | 9/2006 | Castronovo | |
| 7,175,116 B2 | 2/2007 | Castronovo | |
| 7,198,213 B2 | 4/2007 | Kolbet et al. | |
| 7,204,436 B2 | 4/2007 | Castronovo | |
| 7,240,864 B2 | 7/2007 | Castronovo | |
| 7,308,543 B2 | 12/2007 | Kishi | |
| 7,311,277 B2 | 12/2007 | Watanabe et al. | |
| 7,334,747 B2 | 2/2008 | Castronovo | |
| 7,357,340 B2 | 4/2008 | Castronovo | |
| 7,363,317 B2 | 4/2008 | Meliksetian et al. | |
| 7,427,040 B2 | 9/2008 | Castronovo | |
| 7,448,562 B2 | 11/2008 | Castronovo | |
| 7,562,836 B2 | 7/2009 | Langston | |
| 7,588,206 B2 | 9/2009 | Hausman et al. | |
| 7,607,598 B2 | 10/2009 | Castronovo | |
| 7,753,762 B2 * | 7/2010 | Hutchinson | G11B 23/505 |
| | | | 241/277 |
| 2003/0213531 A1 | 11/2003 | Conry | |
| 2004/0050420 A1 | 3/2004 | Huang et al. | |
| 2004/0252628 A1 | 12/2004 | Detzler | |
| 2005/0257049 A1 | 11/2005 | Farag | |
| 2006/0072244 A1 | 4/2006 | Rapp | |
| 2008/0175684 A1 * | 7/2008 | Schmidt | B23Q 1/012 |
| | | | 409/212 |
| 2009/0127341 A1 | 5/2009 | Feng | |
| 2010/0145498 A1 * | 6/2010 | Uchikawa | B23Q 17/22 |
| | | | 700/179 |
| 2010/0294865 A1 | 11/2010 | Wozny | |
| 2011/0069322 A1 | 3/2011 | Hoffer, Jr. | |
| 2011/0085863 A1 * | 4/2011 | Shih | B23Q 1/4852 |
| | | | 408/42 |
| 2011/0305250 A1 | 12/2011 | Chann et al. | |
| 2012/0091237 A1 | 4/2012 | Clark et al. | |
| 2012/0292415 A1 | 11/2012 | Wozny | |
| 2013/0124620 A1 | 5/2013 | Madej | |

\* cited by examiner

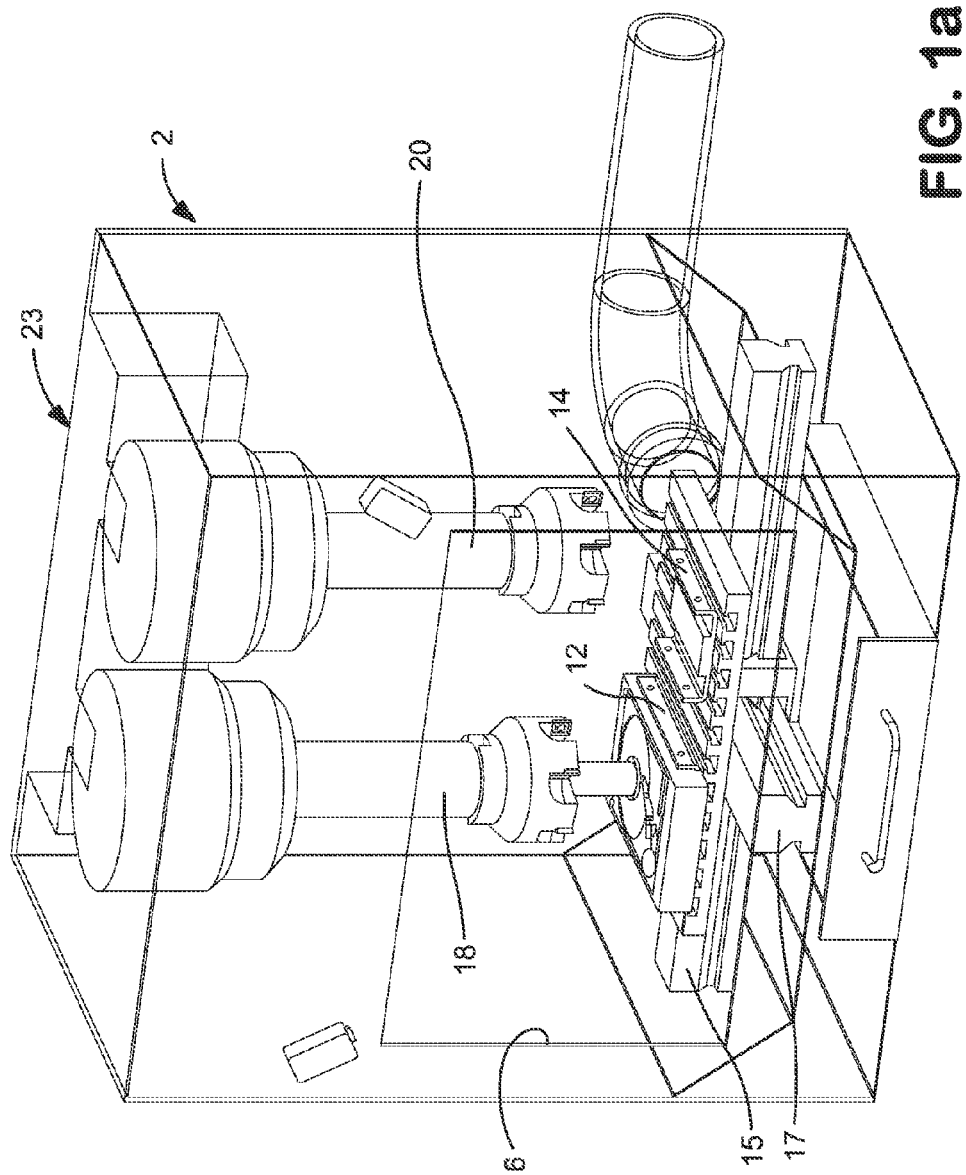

HARD DRIVE DATA DESTROYING DEVICE

CROSS-REFERENCE TO RELATED APPLICATIONS

This application claims the benefit of U.S. Provisional Patent Application No. 61/777,091, entitled "Hard Drive Data Destroying Device", filed Mar. 12, 2013, the disclosure of which is incorporated herein by reference in its entirety.

TECHNICAL FIELD

This application relates generally to a device for destroying the data on a hard drive and more particularly, to a device for destroying the data on the data storage portion of a hard drive so that the data thereon is completely destroyed without having to physically destroy the entire hard drive.

BACKGROUND

Various types of data are stored on the hard drives of computers. Such data may include personal confidential information concerning individuals. This data may include their social security numbers, financial information, health information and private telephone numbers as examples. The hard drives are also used to store corporate information which may include proprietary information such as developing products, customer lists, and business plans. The government may store confidential information including highly classified information on the hard drives.

When it is desired to replace the computer, the data must be removed from the hard drive so that it cannot be misused by unscrupulous individuals. Merely erasing the data by using the computer commands is not sufficient as the data can be recaptured. This is true even if the hard drive is removed for upgrade purposes. However, even if the hard drive is removed, something must be done to destroy the data.

One way of ensuring that the data cannot be used or recovered from an unwanted hard drive is to completely destroy the hard drive. This has been accomplished in the past by completely shredding the entire hard drive. However, as the hard drive is encased in a metal, the complete destruction involves the shredding of a relatively large volume of metal that requires a lot of energy. It is thus desirable to have a process and apparatus for destroying the data on a hard drive that is more energy efficient.

An example of a hard drive data destroying device is shown in U.S. patent application Ser. No. 13/272,472, entitled Hard Drive Shredding Device, filed Oct. 13, 2011 by Clark et al, the disclosure of which is incorporated herein by reference in its entirety.

SUMMARY

According to one aspect of this disclosure there is provided system for physically destroying the data storage portion of electronic media electronic storage devices such as hard disk drives, solid state drives and hybrid hard drives. The system comprises a rotatable milling cutter and a cradle for locating the electronic media storage device in a positioned to engage the milling cutter. The cutter and or the cradle is axially movable to permit the milling cutter engage and remove the data storage portion of the electronic media storage device while leaving at least a substantial portion of the remaining electronic media storage device intact.

According to another aspect a system is provided for physically destroying the data storage portion of electronic media storage devices such as hard disk drives, solid state drives and hybrid hard drives comprising a cutting chamber, a carriage for holding an electronic media storage devices in said chamber, a rotatable milling cutter in said chamber for engaging into said storage device, and a non-rotatable center holding spear coaxial with said milling cutter and axially moveable into contact with said storage device to prevent rotation of storage device while said milling cutter is engaging said device.

According to yet another aspect there is provided a method for physically destroying the data storage portion of electronic media electronic storage devices such as hard disk drives, solid state drives and hybrid hard drives, comprising providing a rotatable milling cutter having an axis, providing a cradle for locating the electronic media storage device in a position to be engaged by said milling cutter, moving said cutter or said cradle in an axial direction and rotating said cutter about its axis to engage and remove the data storage portion of the electronic media storage device while leaving at least a substantial portion of the electronic media storage device intact.

According to a still further aspect, there is provided a system for physically destroying the data storage portion of electronic media electronic storage devices such as hard disk drives, solid state drives and hybrid hard drives that comprises a cutting chamber, a laser for destroying the data storage portion, a cradle for holding an electronic media storage devices in said chamber, said cradle or said laser or both being movable to position the laser relative to the electronic media electronic storage device so that the laser destroys the data storage portion of the electronic media storage device while leaving at least a substantial portion of the electronic media storage device intact.

According to a yet another aspect, a method is provided for physically destroying the data storage portion of electronic media electronic storage devices such as hard disk drives, solid state drives and hybrid hard drives comprising providing a laser, providing a cradle for locating the electronic media storage device in a position to be contacted by the moving said laser and or said cradle so that the laser destroys the data storage portion of the electronic media storage device while leaving at least a substantial portion of the remaining electronic media storage device intact.

According to a still further aspect a chemical system for physically destroying the data storage portion of electronic media electronic storage devices such as hard disk drives, solid state drives and hybrid hard drives is provided which comprises comprising at least one pod for storing a chemical capable of eroding and stripping away the data storage portion of the electronic media electronic storage device, a hollow drill bit associated with each pod drivable into the cavity of the hard drive and a release mechanism of releasing said chemicals to flow through her drill bit into the cavity.

According to yet a still further aspect there is provided a method for chemically destroying the data storage portion of electronic media electronic storage devices such as hard disk drives, solid state drives and hybrid hard drives, comprising providing a chemical in a pod capable of eroding and stripping away the data storage portion of the electronic media electronic storage device, driving a hollow drill bit into the cavity of the hard drive containing the data storage portion of electronic media electronic storage devices; and releasing the chemical to flow through the drill bit into the cavity.

BRIEF DESCRIPTION OF THE DRAWINGS

FIG. 1a is an isometric view of the HDD hard drive data destroyer of FIG. 1 showing the mounting of the cutters and table;

DETAILED DESCRIPTION

In general, the devices described herein can be used for destroying the data storage portion of media electronic storage devices such as HDD, HHD and SSD hard drives. The HDD (Hard Disc Drive) hard drive is essentially a metal platter with a magnetic coating. The coating stores the data. A read/write head on an arm accesses the data while the platters are spinning in a hard drive enclosure. In SSD drives, instead of the magnetic coating on top of platters, the data is stored on interconnected flash memory chips or pods. The SSD drive has no moving parts. The HHD (Hybrid Hard Drive) drive is a hybrid incorporating the HDD and the SSD principles. The various devices described herein can be used to destroy data on all three types of hard drives.

Figure 1:
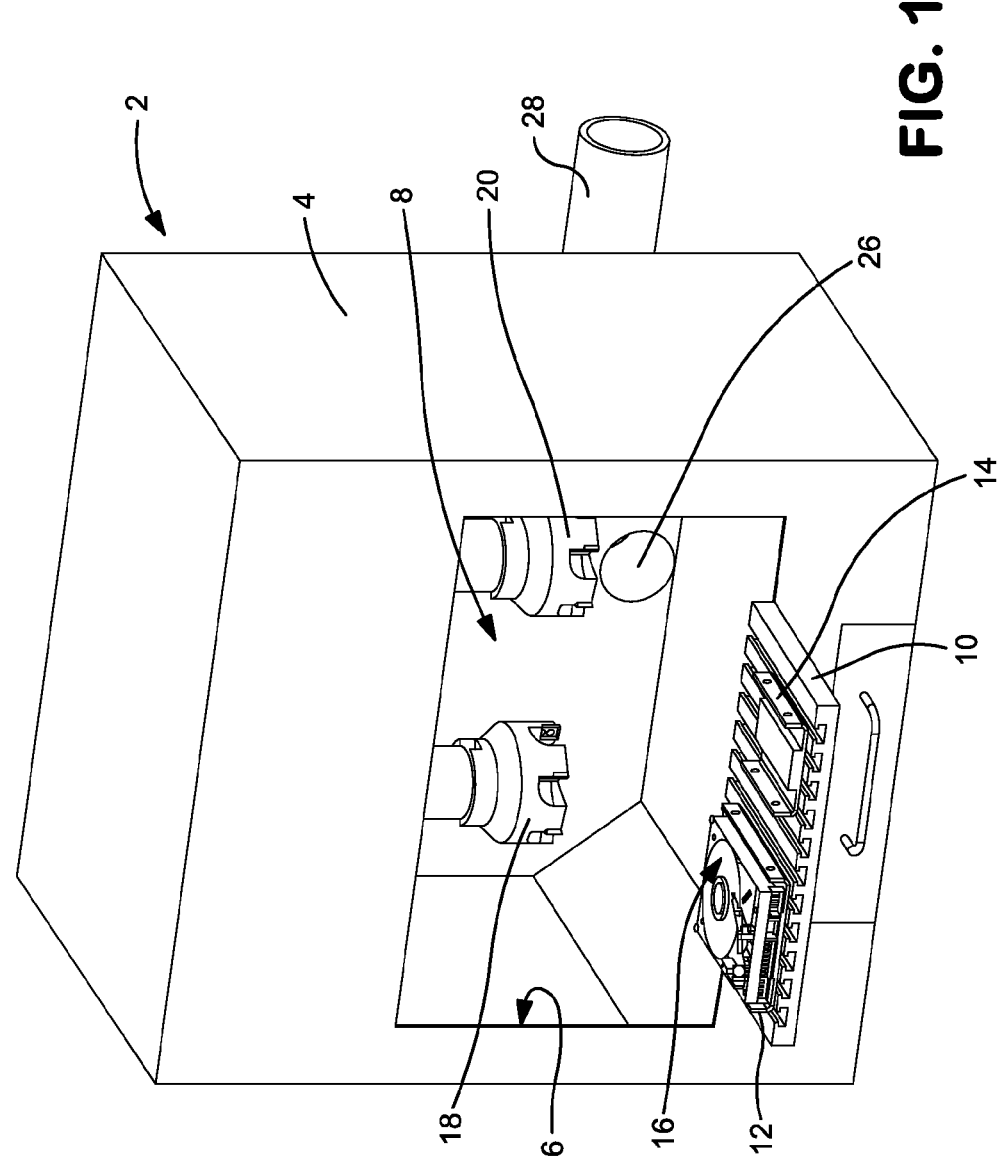
FIG. 1 is an isometric view of a HDD hard drive data destroyer in the loading position.
Figure 6:
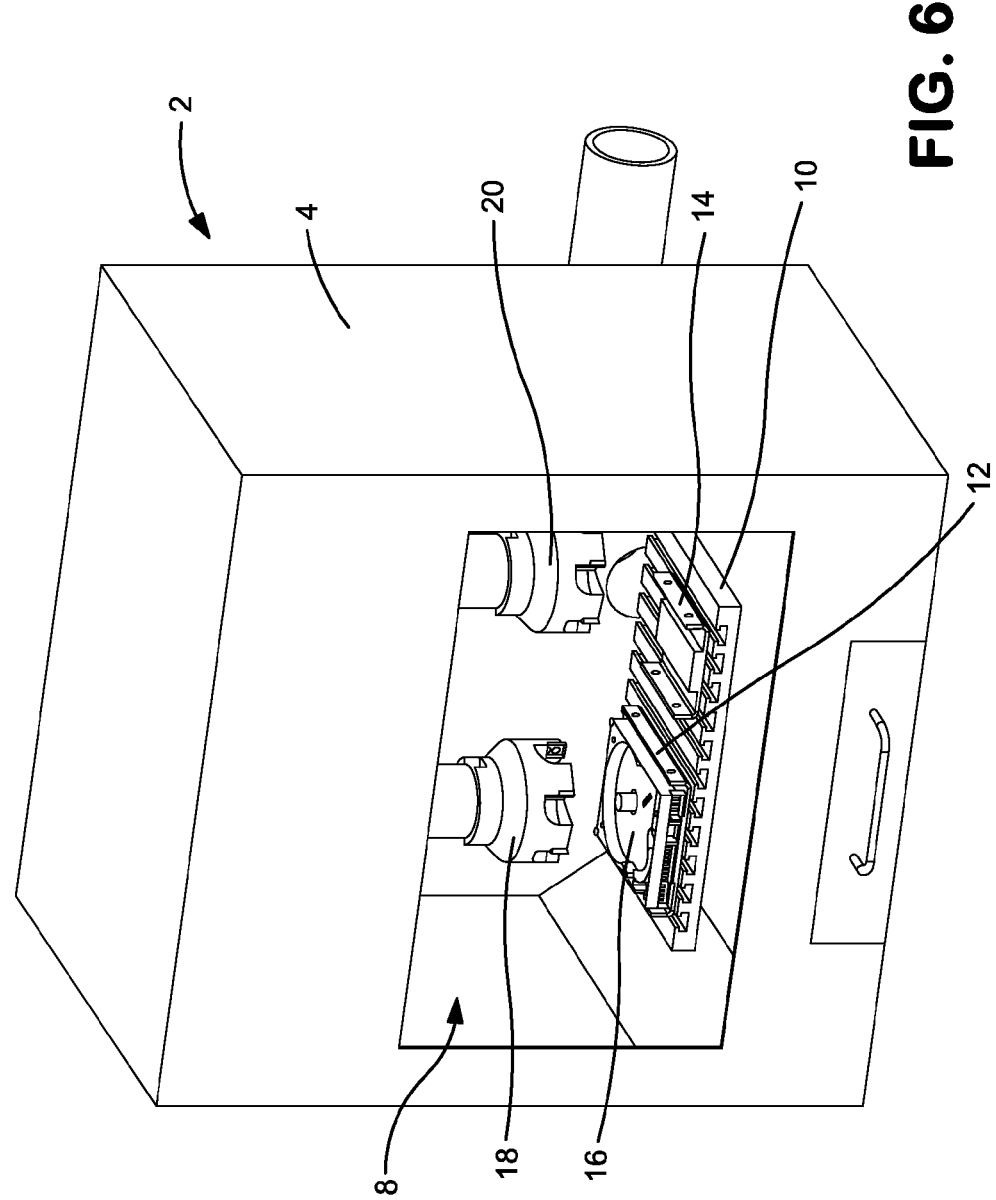
FIG. 6 is an isometric view of the hard drive data destroyer of FIG. 1 showing the hard drive destroyer after the milling cutter is disengaged from the hard drive.

Referring to the drawings, FIGS. 1 and 6 show a hard drive data destroyer 2 that may include a cabinet 4 having a frontal opening 6 opening into a front loading milling chamber 8 and having a door with a safety glass window (not shown) to enclose the chamber 8. A horizontally moveable table 10 is moveable on suitable rails 15 and 17 as shown in FIG. 1a so that the table can be moved in and out of the cabinet 4 and moved in an X and Y direction to position the table within the cabinet 4.

The table 10 has two side by side cradles 12 and 14 for receiving and holding hard drives. The cradle 12 on the left is structured to receive and hold a larger 3.5 inch HDD 16 or SSD hard drive 18 and the cradle 14 on the right is structured to receive and hold a smaller 2.5 inch HDD or SSD hard drive as viewed in FIGS. 1 and 6.

Milling cutters 18 and 20 are mounted in suitable milling heads that may be mounted on a rail system in the cabinet 4 movement along the x-y-z axis. These milling cutters 18 and 20 may be face mill cutters modified to include a center spear 22 as described below or any other suitable milling cutter that can remove material as it is advanced downwardly along its axis and pivoted with a center spear. The milling cutter 18 on the left is relatively large for use with the large hard drives. The milling cutter 20 on the right is relatively small for use with the smaller hard drives. Although two milling cutters are shown, it is possible that just one or more than two milling cutters could be utilized. The milling cutters 18 and 20 are mounted in suitable spindles 21 which are driven by a motor 23.

The milling cutters may also be of the trepanning cutting tool type modified to include the center spear 22 as described below. A trepanning cutting tool may be defined generally as a cutting tool in the form of a circular tube, having teeth at one end, the work piece or tube, or both are rotated and the tube is fed axially into a workpiece, leaving behind a grooved surface in the workpiece.

A center holding spear 22 (See FIG. 4) is provided one coaxial with each the milling cutters 18 and 20. Each holding spear 22 is moveable in a vertical direction relative to its associated cutter 18 or 20 to extend from the center of the cutter. The holding spear 22, while axially moveable, is non-rotatable and can be provided with projections 24 or other sharp edges on its distal end to engage the hub of a hard drive 16.

A vacuum port 26 in the back wall of the cabinet 4 communicates with the milling chamber 8 and is connected to an exhaust pipe 28 and a suitable vacuum pump (not shown) to provide a vacuum system for removing debris from the milling chamber 8.

The 3.5 or 2.5 inch hard drive 16 is placed in a corresponding cradle 12 or 14 on the loading table 10 depending on its size. The larger 3.5 inch HDD or SSD hard drives are placed in the holding cradle 12 on the left as viewed in FIGS. 1 and 6. The smaller 2.5 inch HDD or SSD hard drives are placed in the cradle 14 on the right. The placement of the hard drives corresponds with the size of the mill cutters 18 and 20 positioned within the milling chamber 8. The larger cutter 18, on the left, is used to destroy 3.5 inch HDD or SSD hard drives and the smaller cutter 20, on the right, is used to destroy 2.5 inch HDD or SSD hard drives.

The loading process can be done automatically by placing the respective hard drives 16 or 18 in a vertical "magazine" styled loading chassis, which indexes the hard drives into an empty cradle after the previous destroying operation has been completed.

Figure 2:
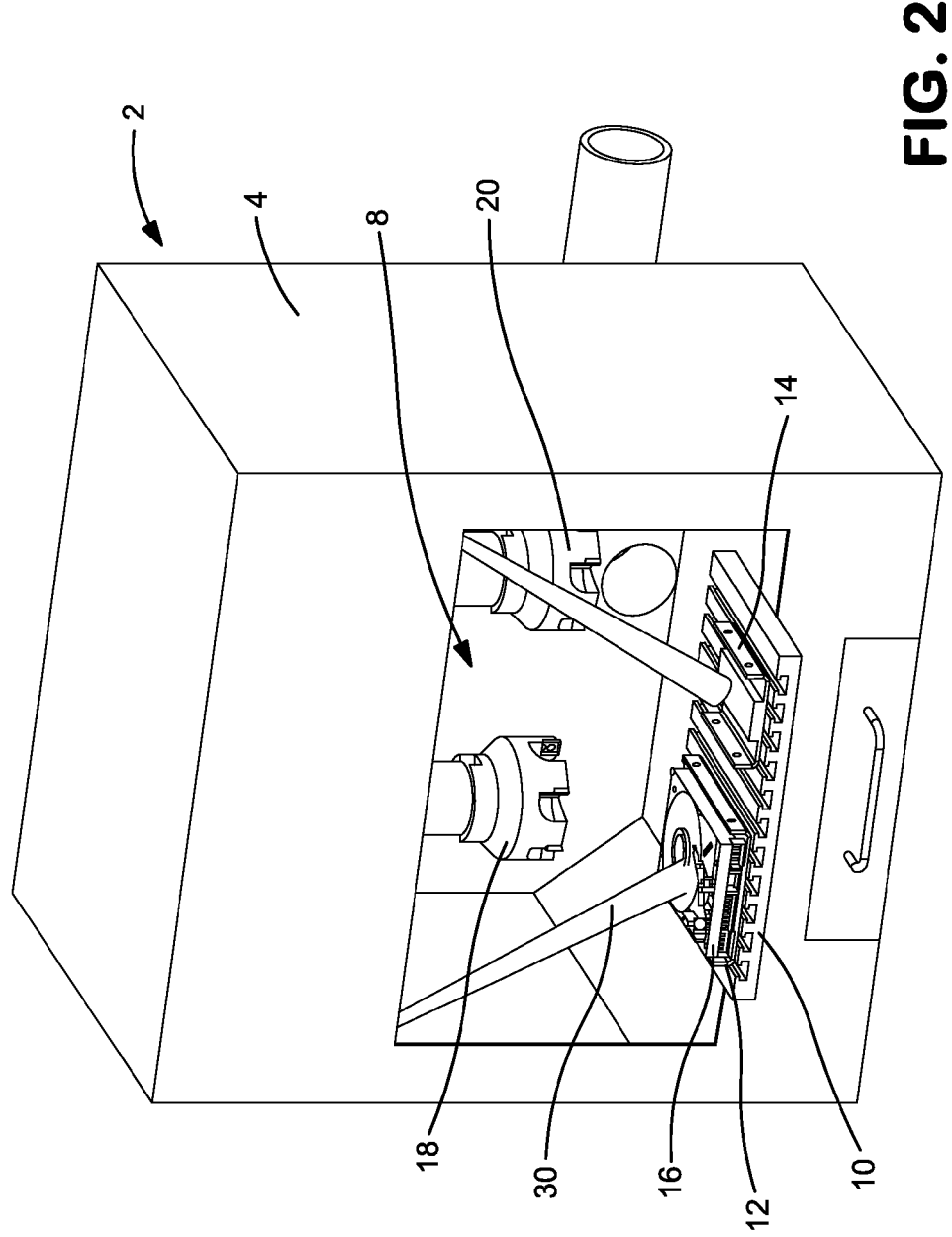
FIG. 2 is an isometric view of the hard drive data destroyer of FIG. 1 showing the vision verification.
Figure 9:
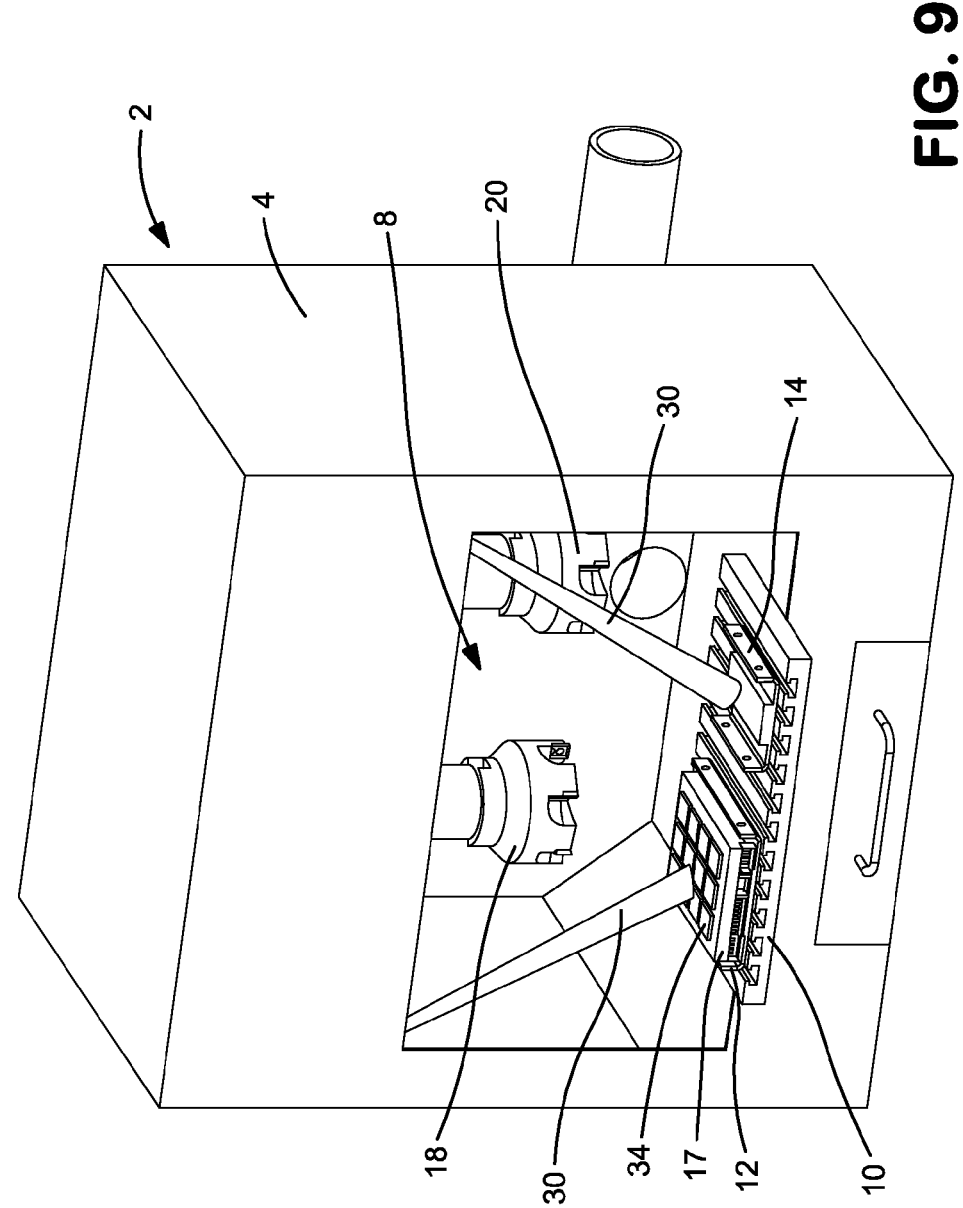
FIG. 9 is an isometric view of the hard drive data destroyer of FIG. 8 showing the vision verification.

Visual verification as shown in FIGS. 2 and 9 may take place after the hard drives are loaded onto a cradle 12 or 14. The hard drive 16 or 18 is scanned by a suitable scanning system which may be mounted on the cabinet 4 with the scanning beam 30 directed to scan a hard drive positioned on a cradle 12 or 14 before the cradle 12 or 14 is moved into the chamber 8. The scanning system may include a barcode scanner and a visioning sensor/camera that will scan the bar code, brand, serial number and will identify the hard drive by height, length and width along with identifying where the platter hub is located in the case of HDD drives. The information from the scanning system is fed to a computer where the information is processed and store and used to activate the CNC system position the respective milling cutter with the type of hard drive identified in the cradle 12 or 14.

The computer includes a database of hard drives in the market place to quickly identify and sequence the hard drive with the appropriate milling process. When new hard drives are introduced to the hard drive shredder, the servo and visioning system makes the necessary adjustments to complete the milling process. Then the information is saved in the database for future recognition.

Figure 3:
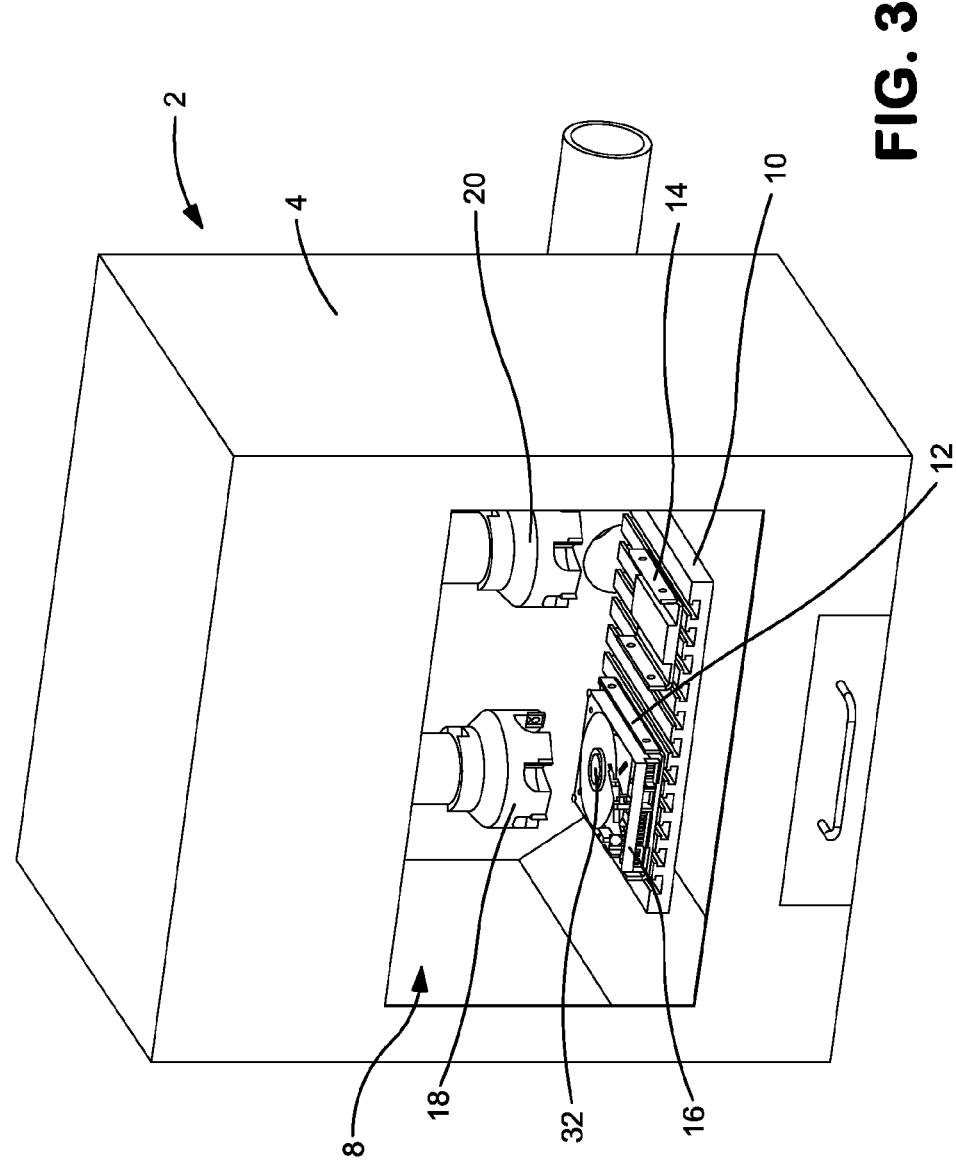
FIG. 3 is an isometric view of the hard drive data destroyer of FIG. 1 showing the loading table positioned in the milling chamber.
Figure 10:
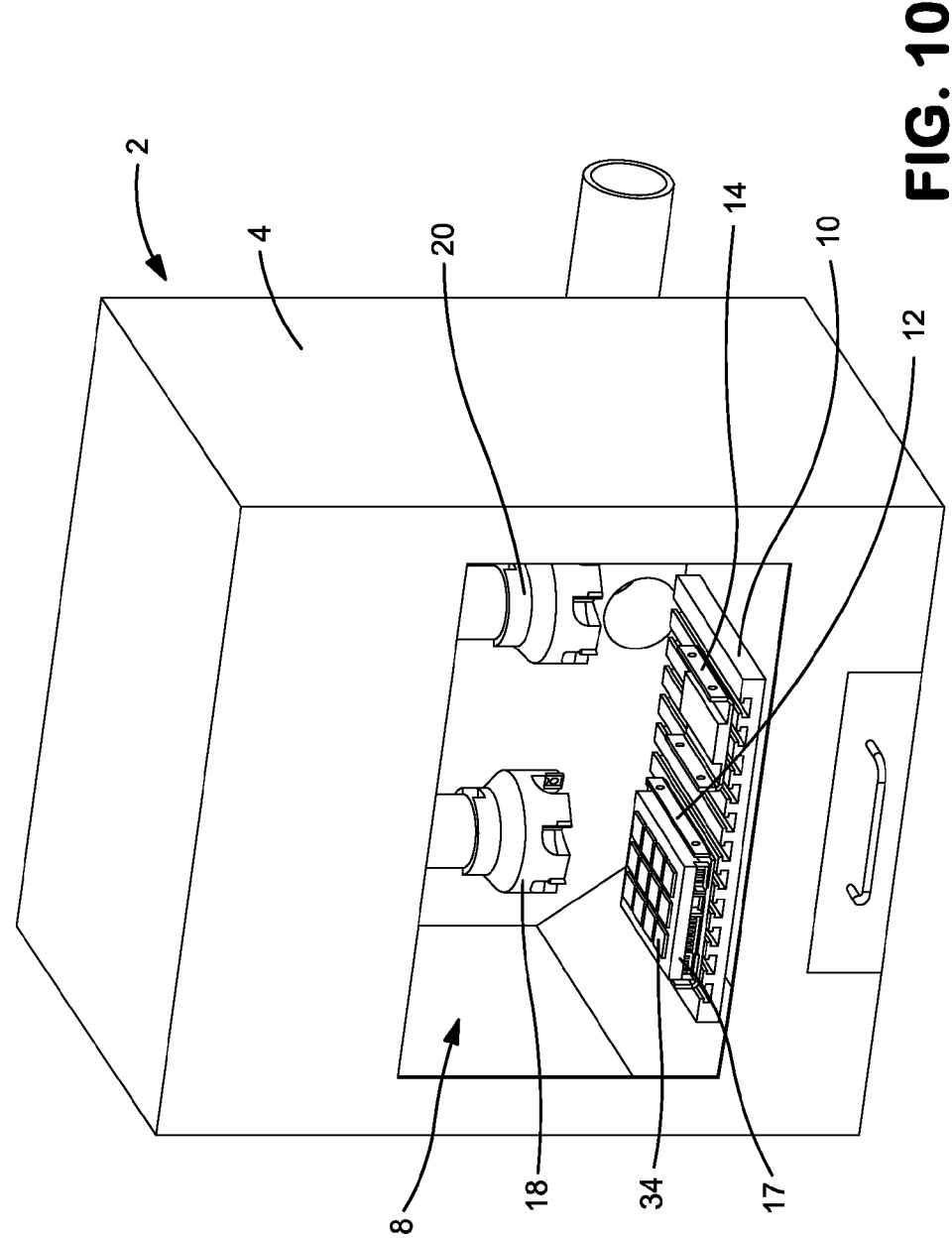
FIG. 10 is an isometric view of the hard drive data destroyer of FIG. 8 showing the loading table positioned in the body of the milling chamber.

Once the hard drive 16 or 18 is placed in either the 3.5 or 2.5 inch holding chassis 12 or 14, and the computer has identified the specific type of hard drive, the loading table 10 is automatically activated and moves inside the body of the cabinet milling chamber 8 as shown in FIGS. 3 and 10.

Figure 4:
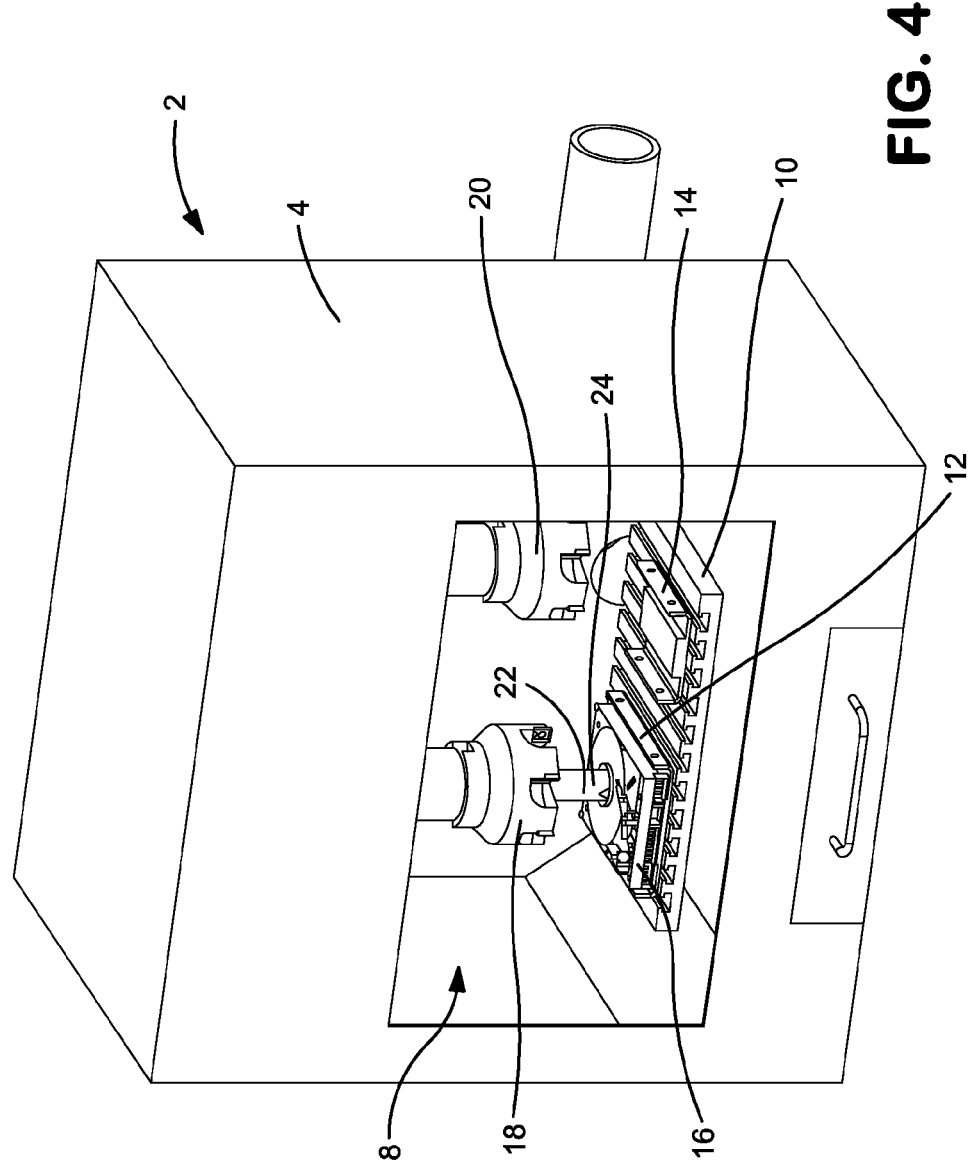
FIG. 4 is an isometric view of the hard drive data destroyer of FIG. 1 showing the center spear of the milling cutter engaging the hard drive.

When the center hub 32 of the 3.5 or 2.5 inch HDD hard drive is located, the two-phase pneumatic milling head will first lower the center holding spear 22, which applies pressure to the center hub 32 preventing the hard drive platters from spinning during the milling process as shown in FIG. 4. The center holding spear 22 is not activated when destroying SSD hard drives.

Figure 5:
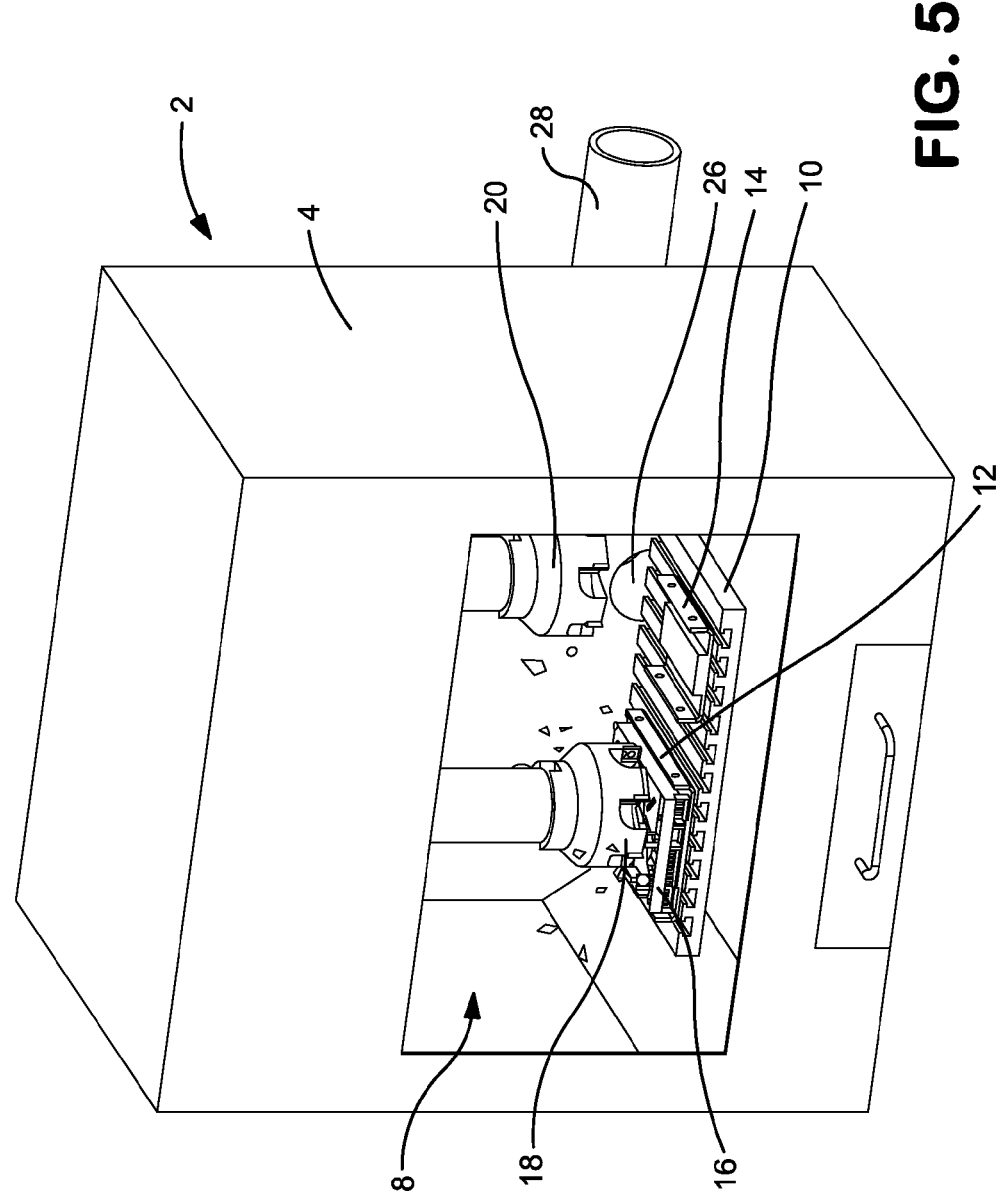
FIG. 5 is an isometric view of the hard drive data destroyer of FIG. 1 showing the milling cutter engaging the hard drive.
Figure 11:
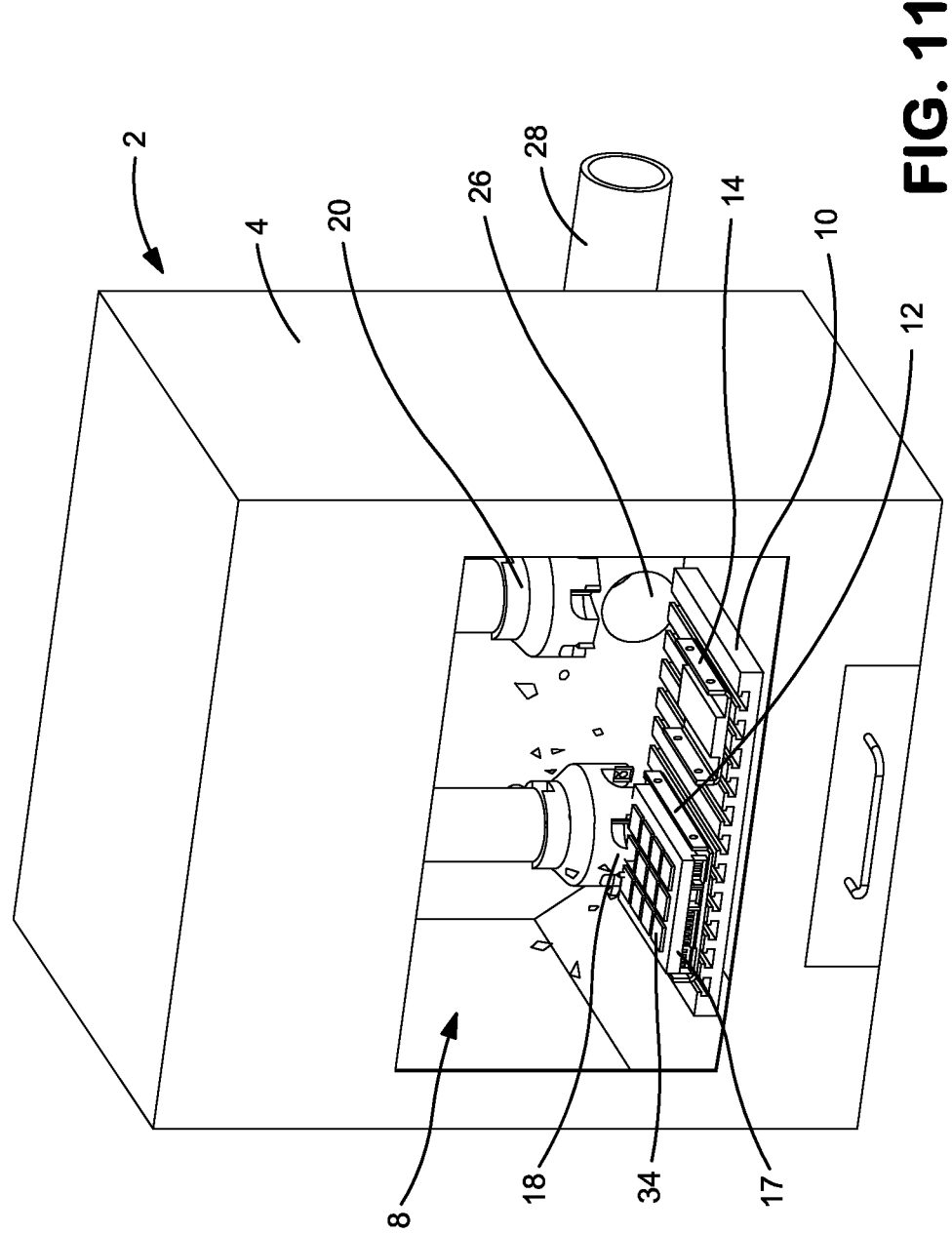
FIG. 11 is an isometric view of the hard drive data destroyer of FIG. 8 showing the milling cutter engaging the hard drive.

The next phase of the HDD milling process consists of lowering the outer milling cutter 18 or 20 to the surface of the 3.5 or 2.5 inch hard drive as shown in FIGS. 5 and 11. The blades of the face of the milling cutter penetrate the surface of the hard drive coring-out the platter(s) of the hard drive in the case of the HDD drives.

When SSD hard drives are being destroyed, the milling cutter 18 is swept across the surface of the 3.5 or 2.5 inch hard drive to destroy (face mill) the area where the information pods 34 are located. The mill cutter 18 may be swept in a side to side, front to back or a combination of such movements in a horizontal plane. Alternatively, the cradle 12 or 14 may be moved relative to the mill cutter 18 to provide the sweeping action. In either case, such action comprises a coring and surface milling operation.

The vacuum system is automatically activated during the milling process to collect the shards that are produced. The vacuum system draws the shards out of the milling chamber 8 through the exhaust port 26 and exhaust pipe 28 to an appropriate collection bin (not shown).

When the milling process for the HDD hard drives is completed the outer mill cutter 18 and center holding spear 20 retract from the surface of the hard drive as shown in FIG. 6. All that remains is the surrounding casing of the 3.5 or 2.5 inch hard drive and the center hub, which once held the information platter(s). The finished product resembles a donut.

Figure 12:
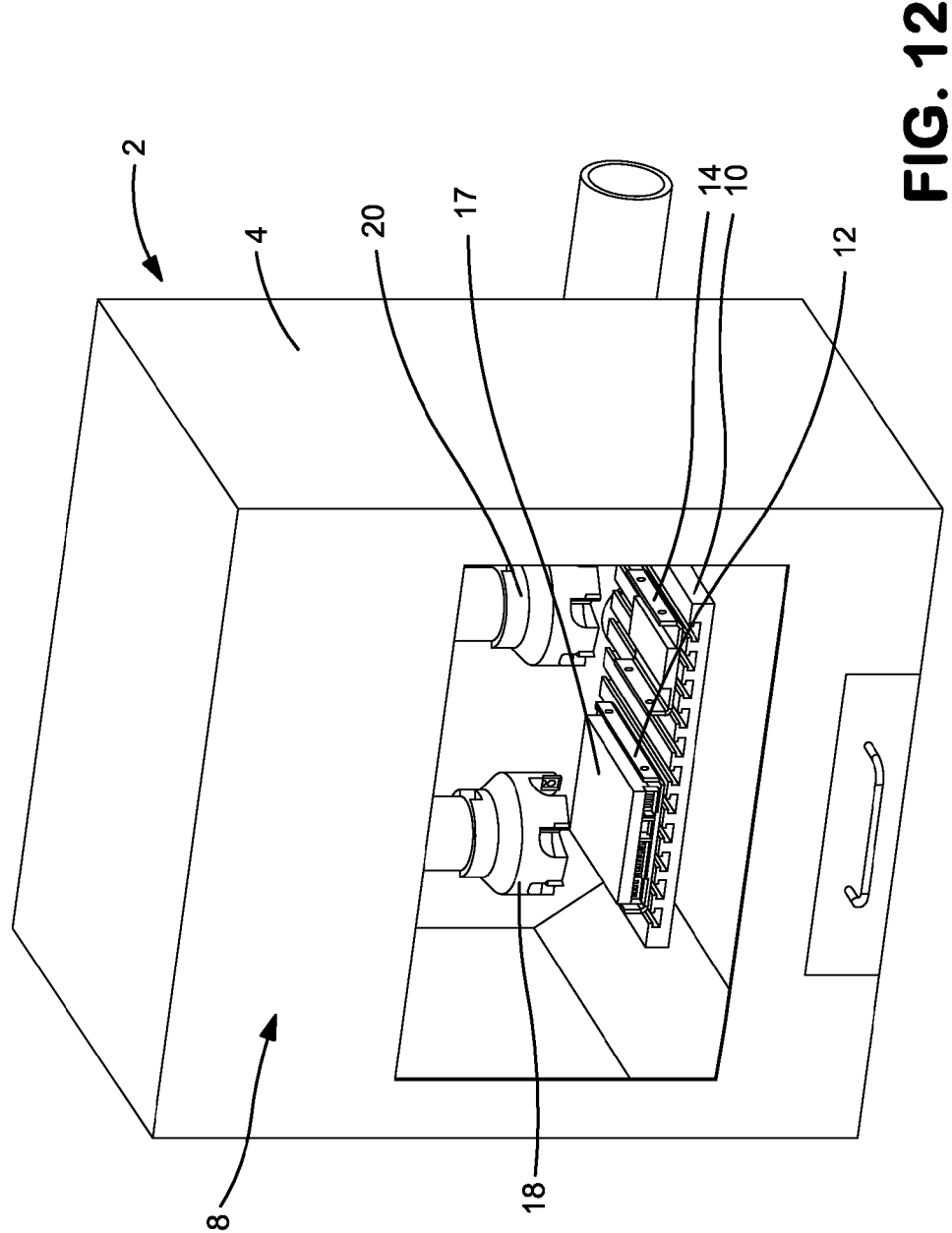
FIG. 12 is an isometric view of the hard drive data destroyer of FIG. 8 showing the hard drive destroyer after the milling cutter is disengaged from the hard drive.

When the SSD milling process for the SSD hard drives is completed as shown in FIG. 12, the mill cutter 18 is retracted from the surface of the hard drive and returned to its start position. All that remains is the bottom casing of the 3.5 or 2.5 inch hard drive less the area where the information pods were located.

Figure 7:
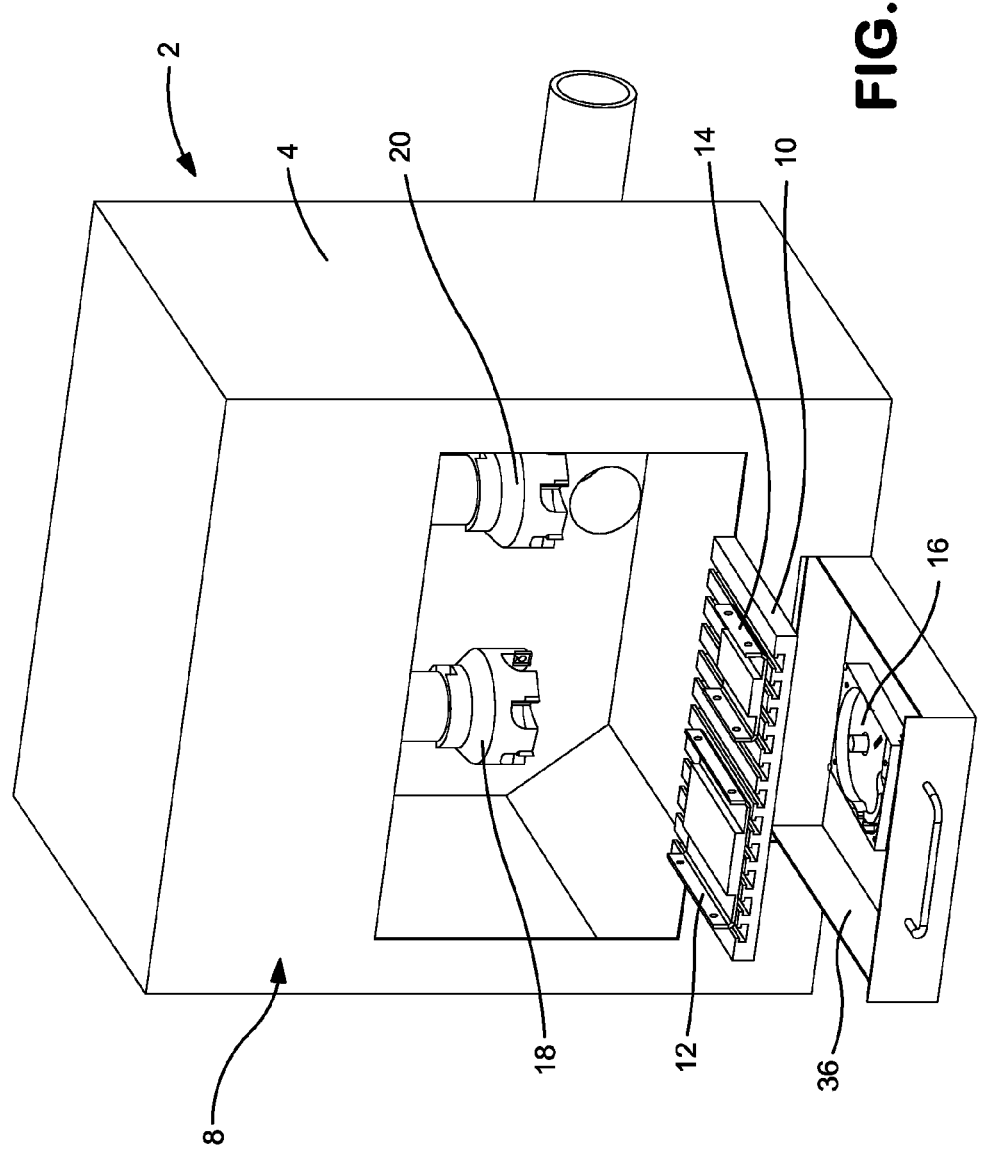
FIG. 7 is an isometric view of the hard drive data destroyer of FIG. 1 showing the hard drive data destroyer after the destroying operation is completed.
Figure 8:
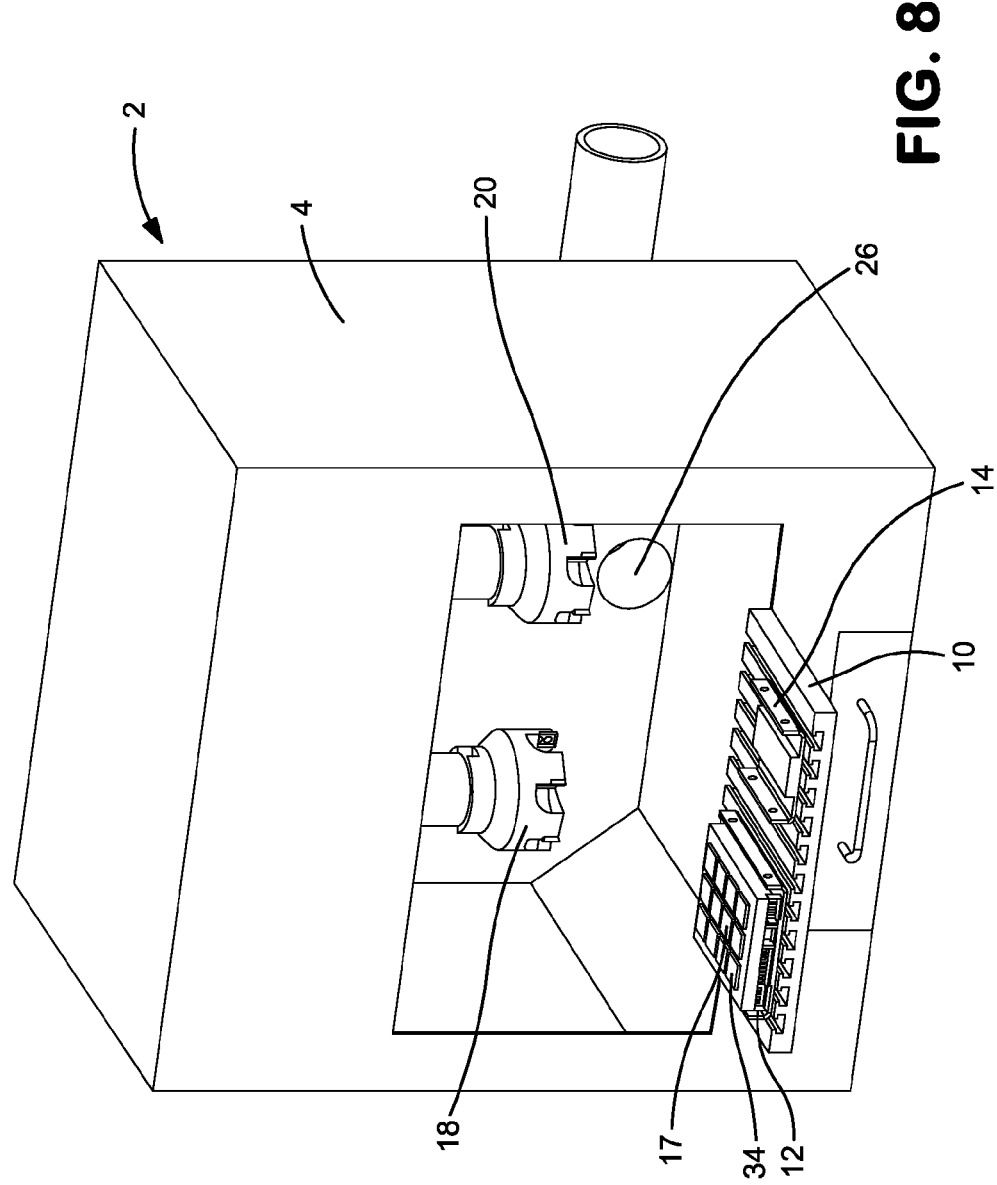
FIG. 8 is an isometric view of the hard drive data destroyer for SSD hard drives showing the destroyer in the loading position.
Figure 13:
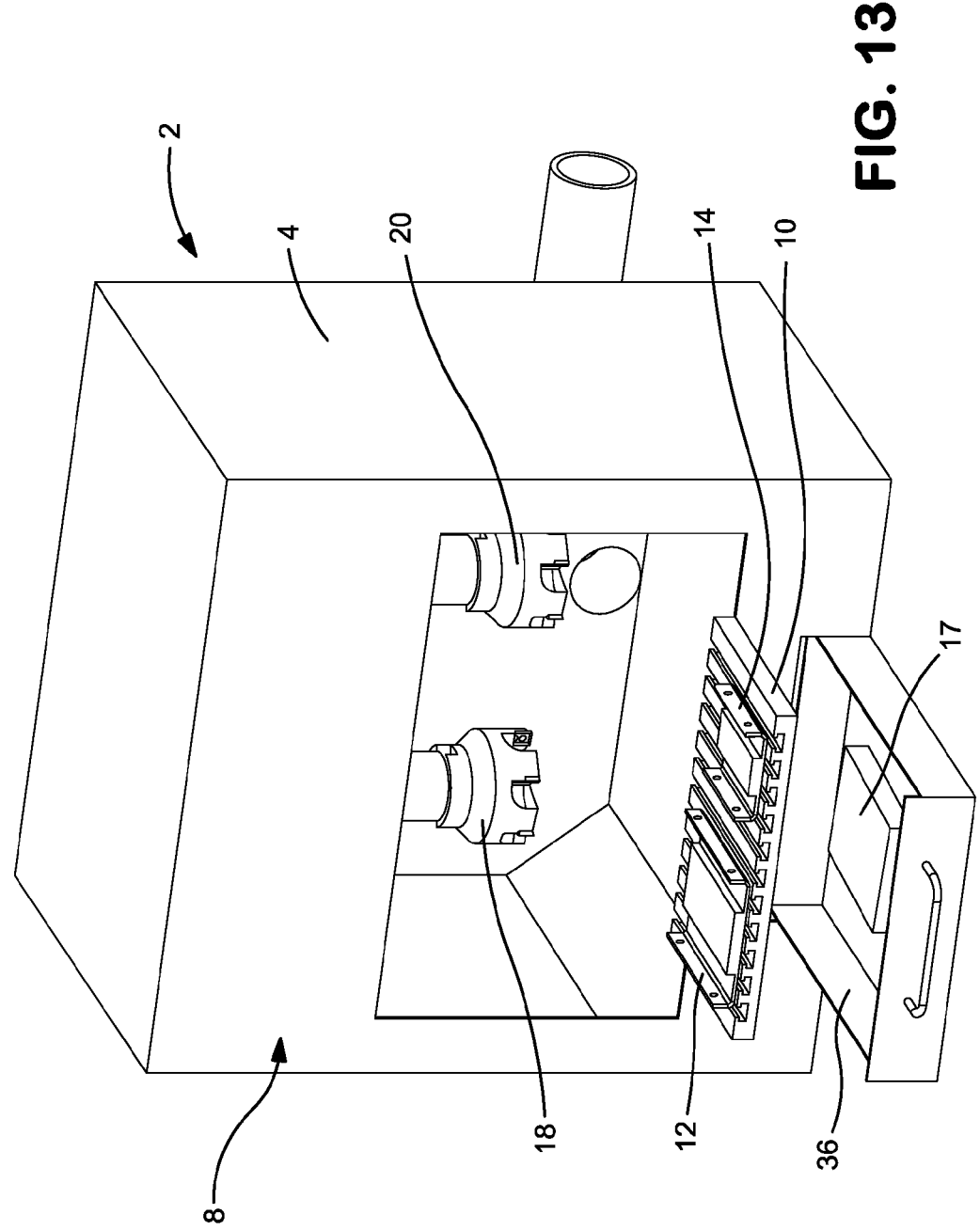
FIG. 13 is an isometric view of the hard drive data destroyer of FIG. 8 showing the hard drive data destroyer after the destroying operation is completed.

When the HDD or SSD hard drive milling cycle is complete, a respective hard drive 16 or 18 is automatically ejected from its holding cradle 12 or 14 into a collection bin 36 below the milling chamber 8 to cool as shown in FIGS. 7 and 13. The loading table 10 with the empty holding cradles 12 and 14 exits the milling chamber 8 to begin the next milling cycle.

Figure 26:
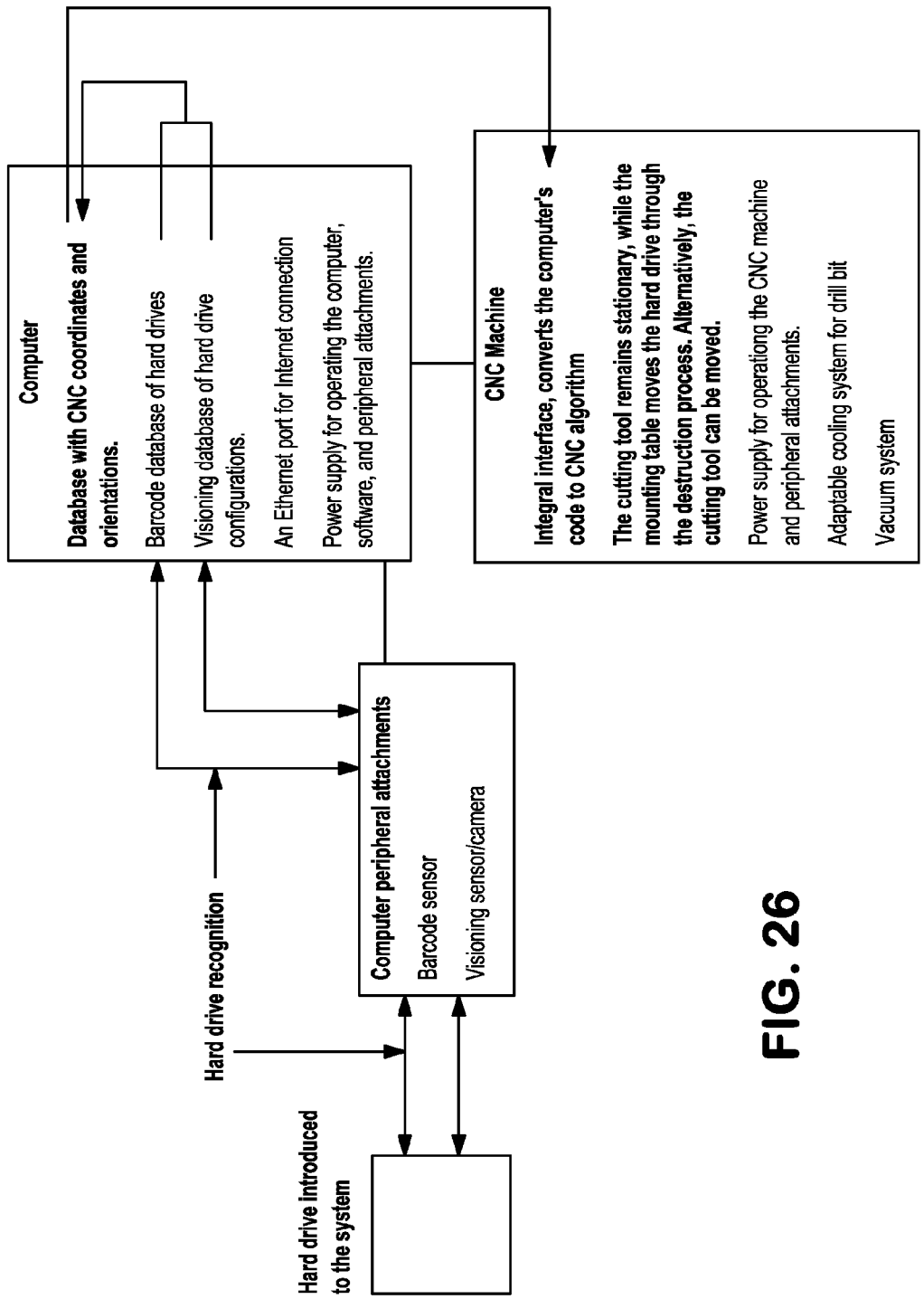
FIG. 26 is a block diagram of the milling process of FIGS. 1-13.

The milling process system is schematically shown in the block diagram shown in FIG. 26. The hard drive on the cradle is scanned for recognition by the scanning system which may include a barcode sensor and a visioning sensor/camera. The information scanned is fed to a computer, attached to or mounted in the cabinet, and which has a data base for storing information about the hard drives. The computer converts the information about the hard drive in the cradle to a form to send to the CNC machine which controls the movement of the system. The computer may include an Ethernet port for connection to the internet along with a power supply for operating the computer, software and peripheral attachments.

A plurality of individual hard drive destroyers 2 may be provided, each at a separate location such as individual kiosks. The computer provides a means for the individual destroyers 2 to communicate with each other and/or with a centralized data base.

FIGS. 14-25 show a hard drive data destroyer 102 that utilizes a laser to destroy the drive. FIGS. 14-19 show the laser hard drive data destroyer operating on a HDD hard drive 104 while FIGS. 20-25 show the laser hard drive data destroyer operating on a SSD hard drive 106.

Figure 14:
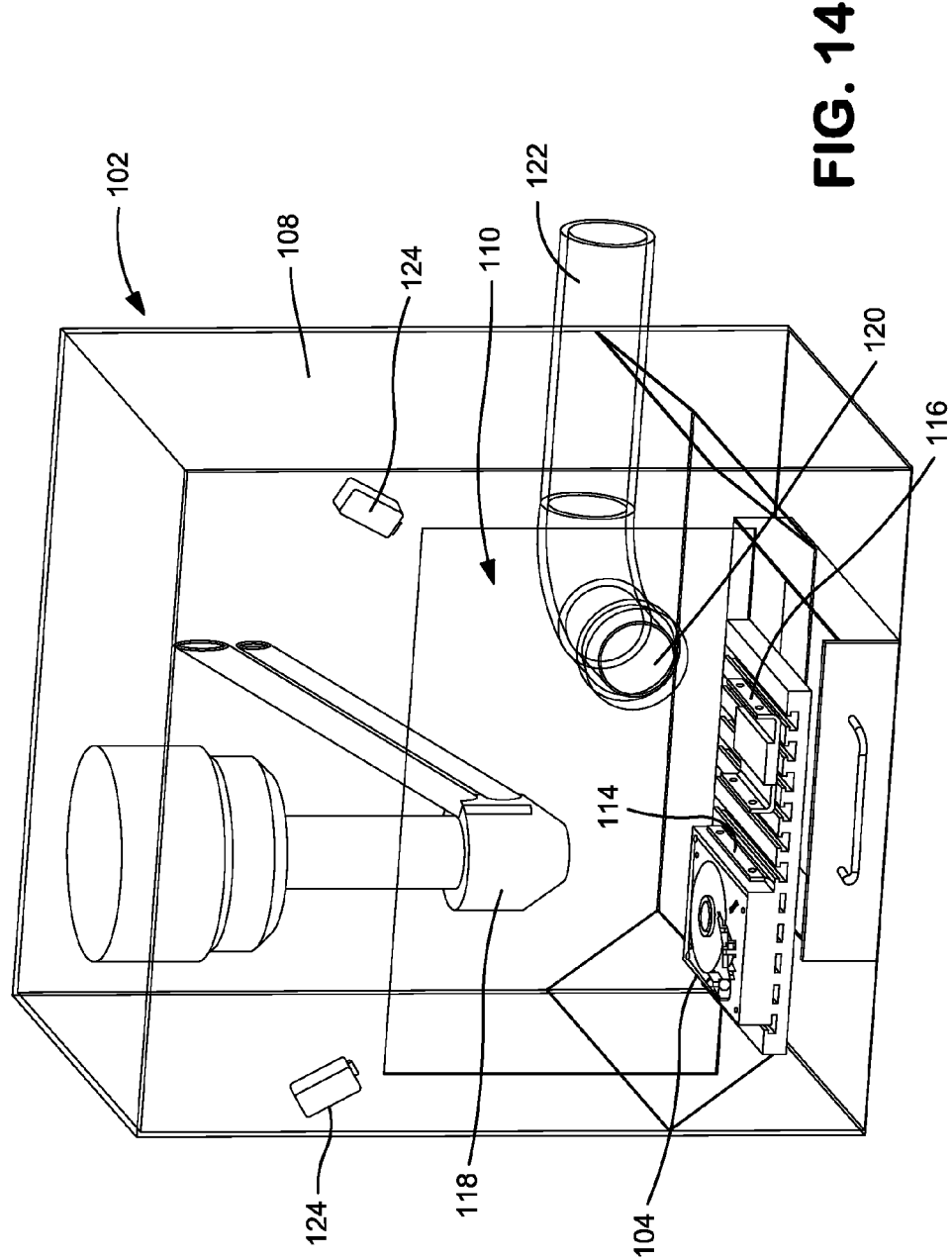
FIG. 14 is an isometric view of a laser HDD hard drive data destroyer in the loading position.
Figure 20:
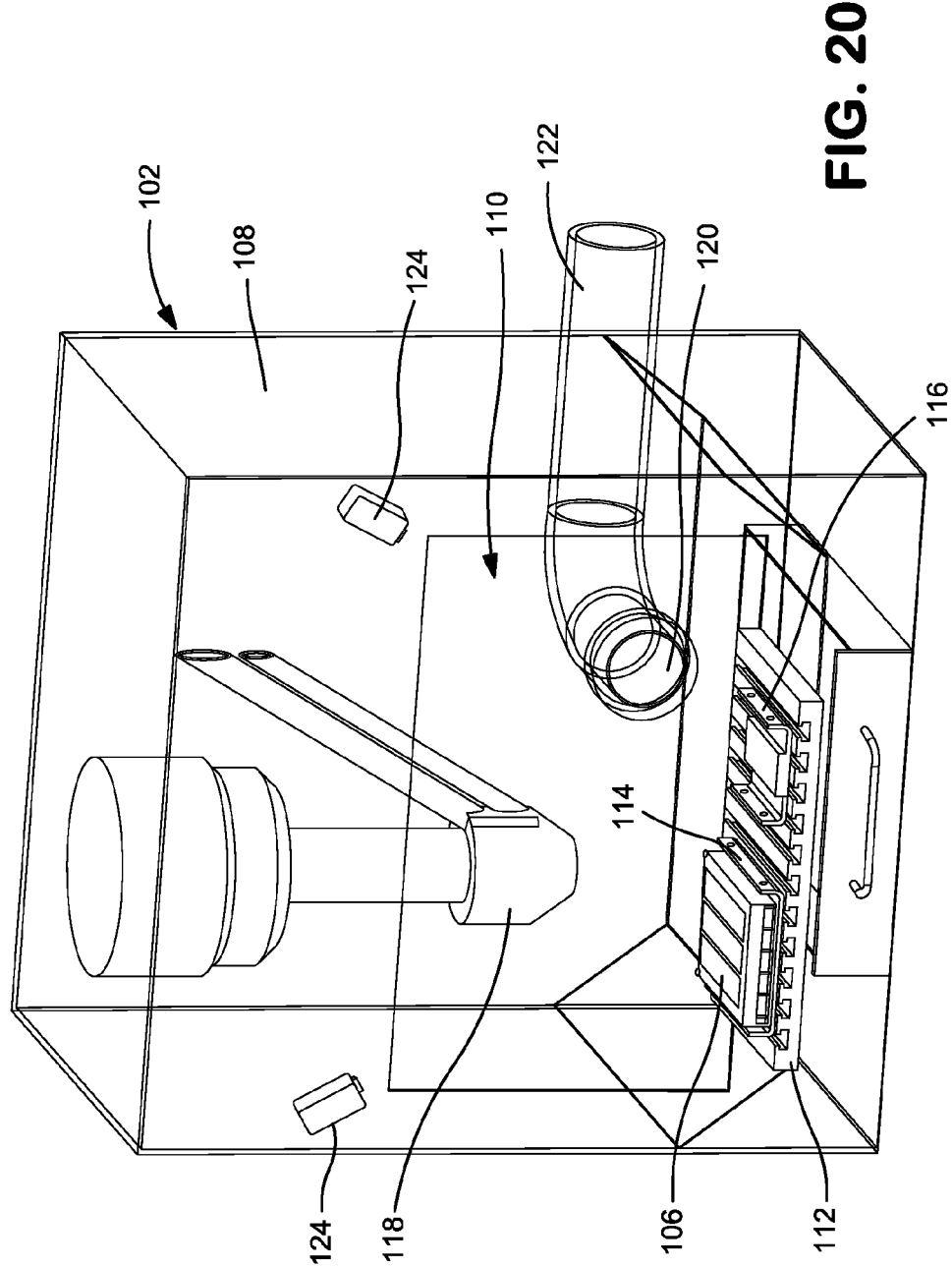
FIG. 20 is an isometric view of the laser hard drive data destroyer of FIG. 20 after completion of the laser perforation process.

As shown in FIGS. 14 and 20, the laser hard drive data destroyer may include a cabinet 108 having a front loading laser perforating chamber with a frontal opening and a door (not shown) to close the chamber 110. A horizontally moveable table 112 is moveable on suitable tracks for movement into and out of the chamber 110.

The table 112 has two side by side cradles 114 and 116 for receiving and holding hard drives. The cradle 114 on the left is structured to receive and hold a larger 3.5 inch HDD or SSD hard drive and the cradle 116 on the right is structured to receive and hold a smaller 2.5 inch HDD or SSD hard drive.

A 3.5 or 2.5 inch hard drive is placed in a corresponding cradle 114 or 116 on the loading table 112 depending on its size. The larger 3.5 inch HDD or SSD hard drives are placed in the holding cradle 114 on the left as viewed in FIGS. 14 and 20. The smaller 2.5 inch HDD or SSD hard drives are placed in the cradle 116 on the right.

The loading process can be done automatically by placing the respective hard drives in a vertical "magazine" styled loading chassis, which indexes the hard drives into the empty hard drive holding chassis after the previous laser perforation cycle is complete.

A laser head 118 is mounted in the cabinet above the table 112. The laser head is moveable in the x-y-z direction to properly align with a hard drive in a cradle 112 or 116 when the table 112 with a hard drive is positioned in the chamber 110.

A vacuum port 120 in the back wall of the cabinet 108 communicates with the laser perforating chamber 110 and is connected to an exhaust pipe 122 and a suitable vacuum pump (not shown) to provide a vacuum system for moving debris from the perforating chamber 110.

Figure 15:
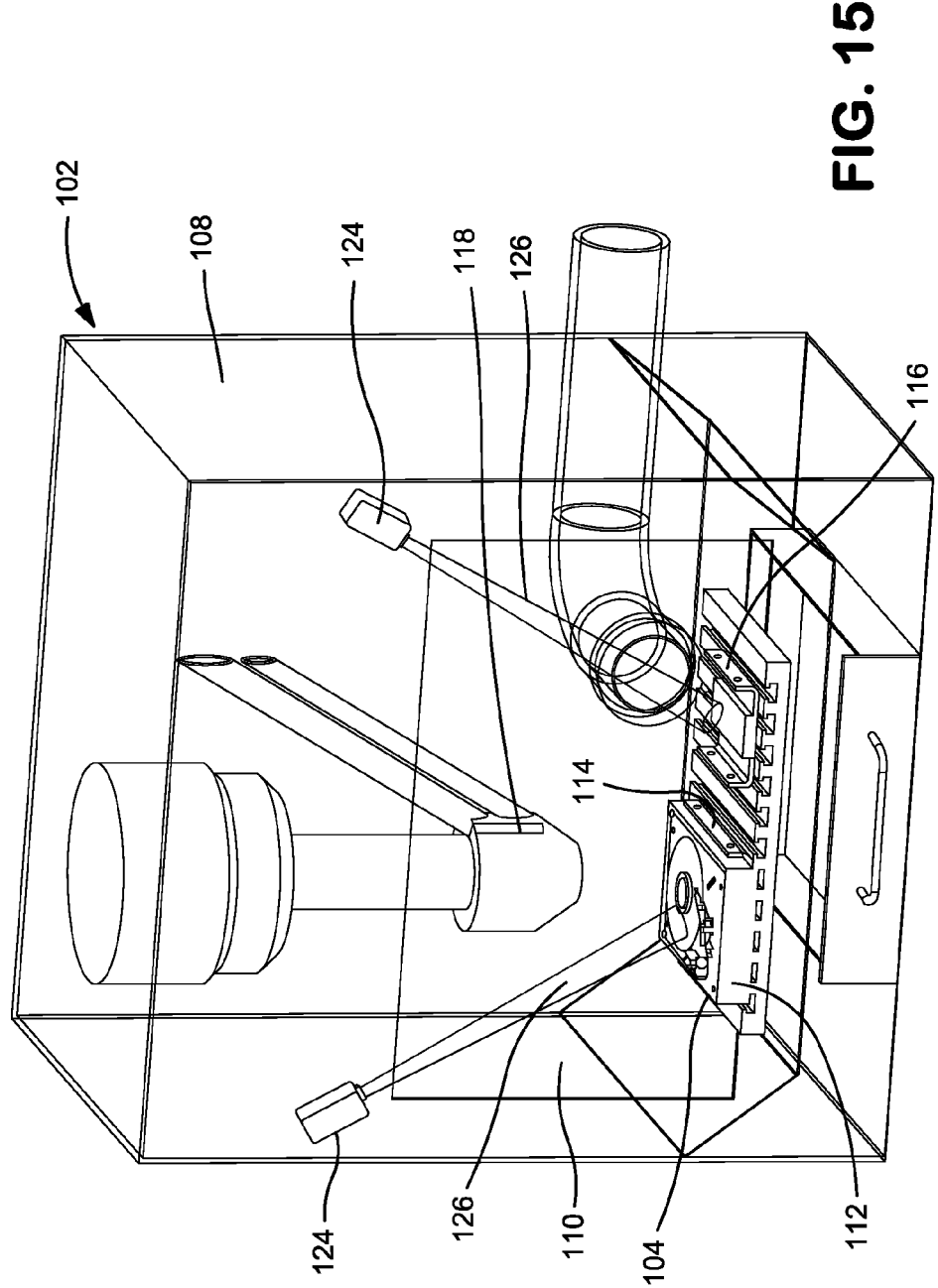
FIG. 15 is an isometric view of the laser hard drive data destroyer of FIG. 14 showing the vision verification.
Figure 21:
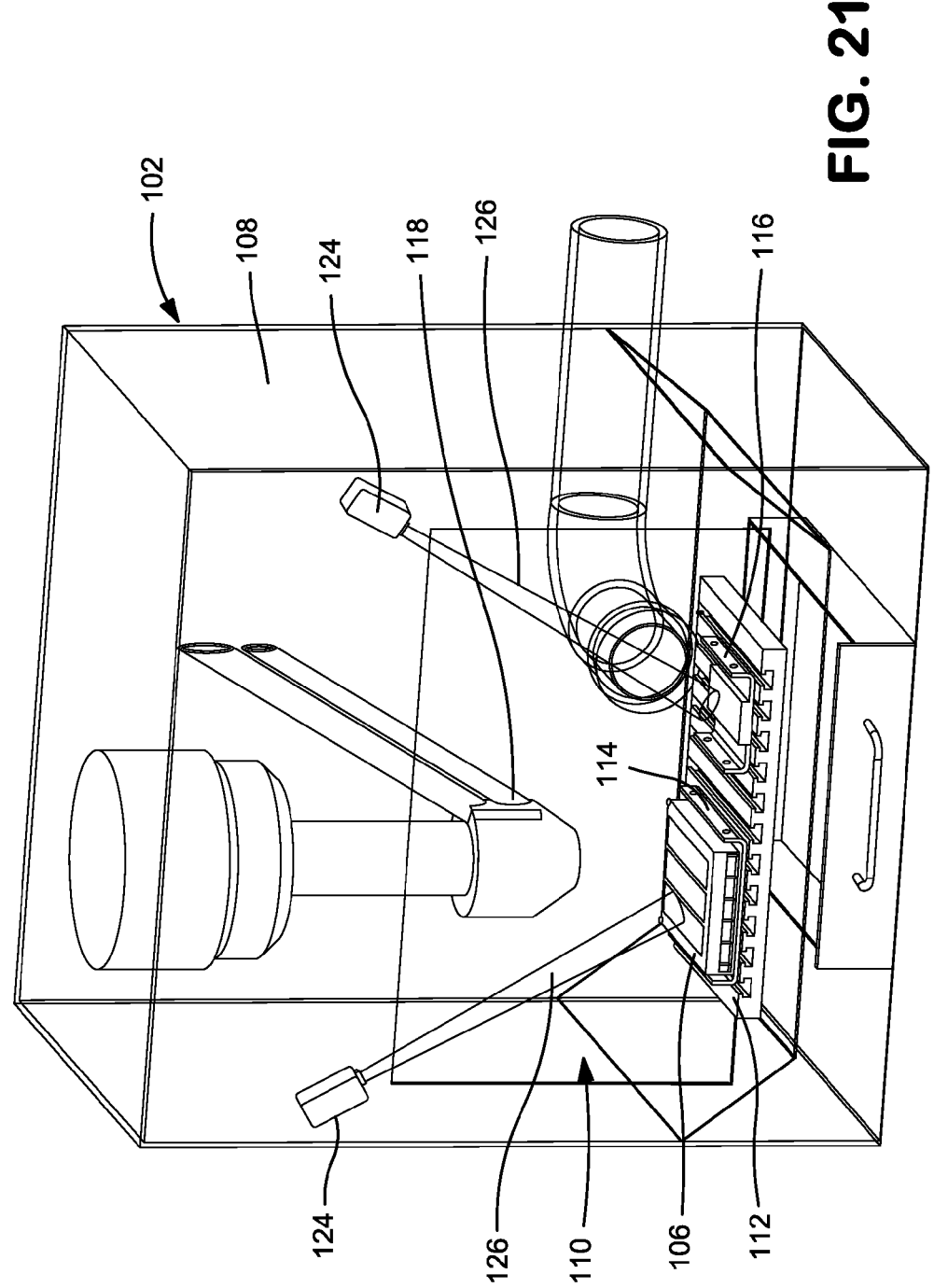
FIG. 21 is an isometric view of the laser hard drive data destroyer of FIG. 20 showing the vision verification.

Visual verification as shown in FIGS. 15 and 21 may take place after the hard drives are loaded onto the cradle. The barcode on the hard drive 104 or 106 is scanned by scanner 124 positioned on the cabinet to scan the bar code on the hard drive. The scan activates a custom x-y-z servo and visioning system to properly position the laser head 118 with the type of hard drive identified in the holding cradle 114 or 116. A custom servo-visioning system may consist of a database of hard drives in the market place to quickly identify and sequence the hard drive with the appropriate laser perforation pattern. When new hard drives are introduced to the laser perforating system, the servo-visioning system makes the necessary adjustments to complete the laser perforating process. Then the information is saved in the database for future recognition.

Figure 16:
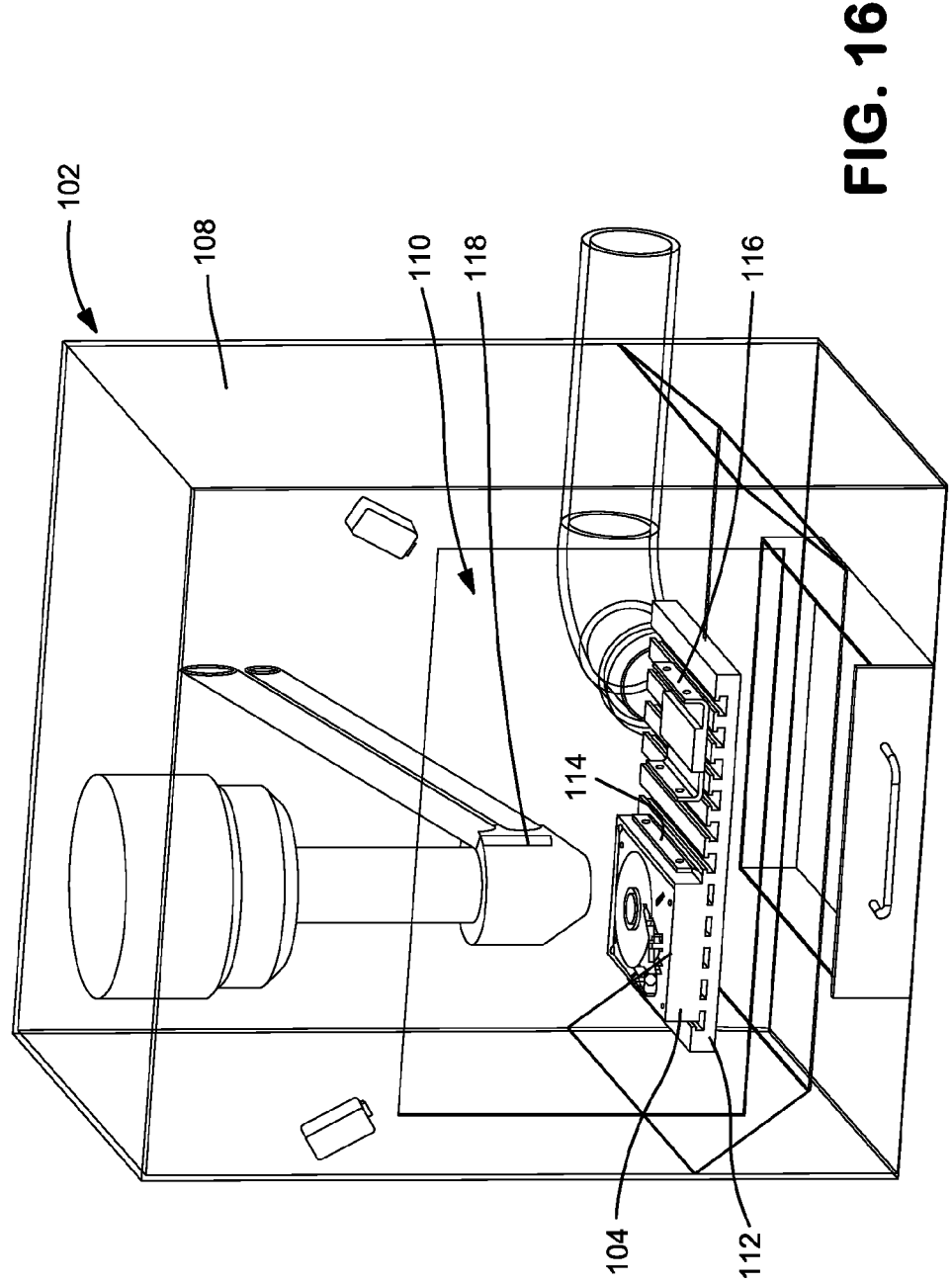
FIG. 16 is an isometric view of the laser hard drive data destroyer of FIG. 14 showing the loading table positioned in the laser perforating chamber.
Figure 17:
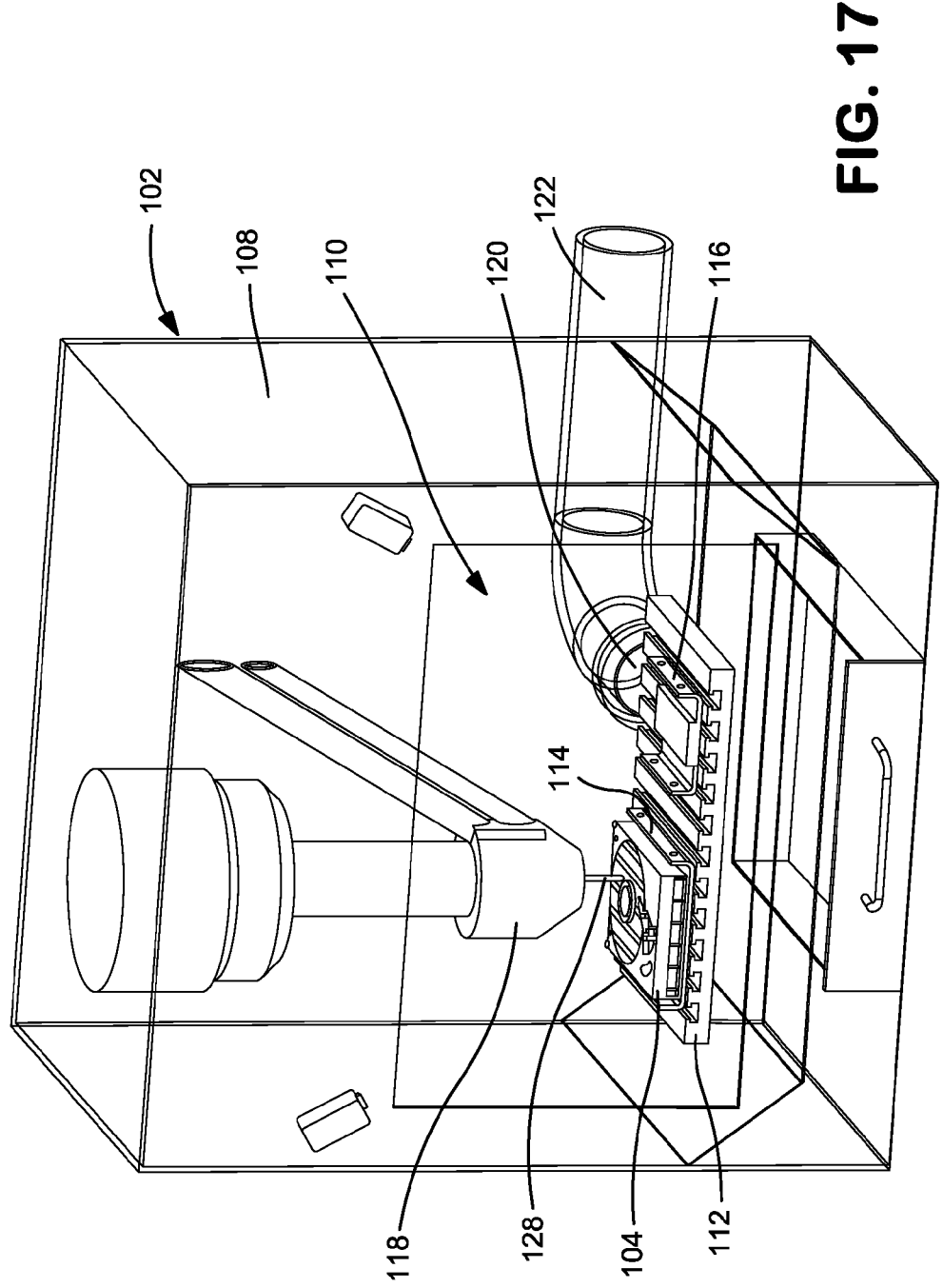
FIG. 17 is an isometric view of the laser hard drive data destroyer of FIG. 14 showing the laser acting on the hard drive.
Figure 22:
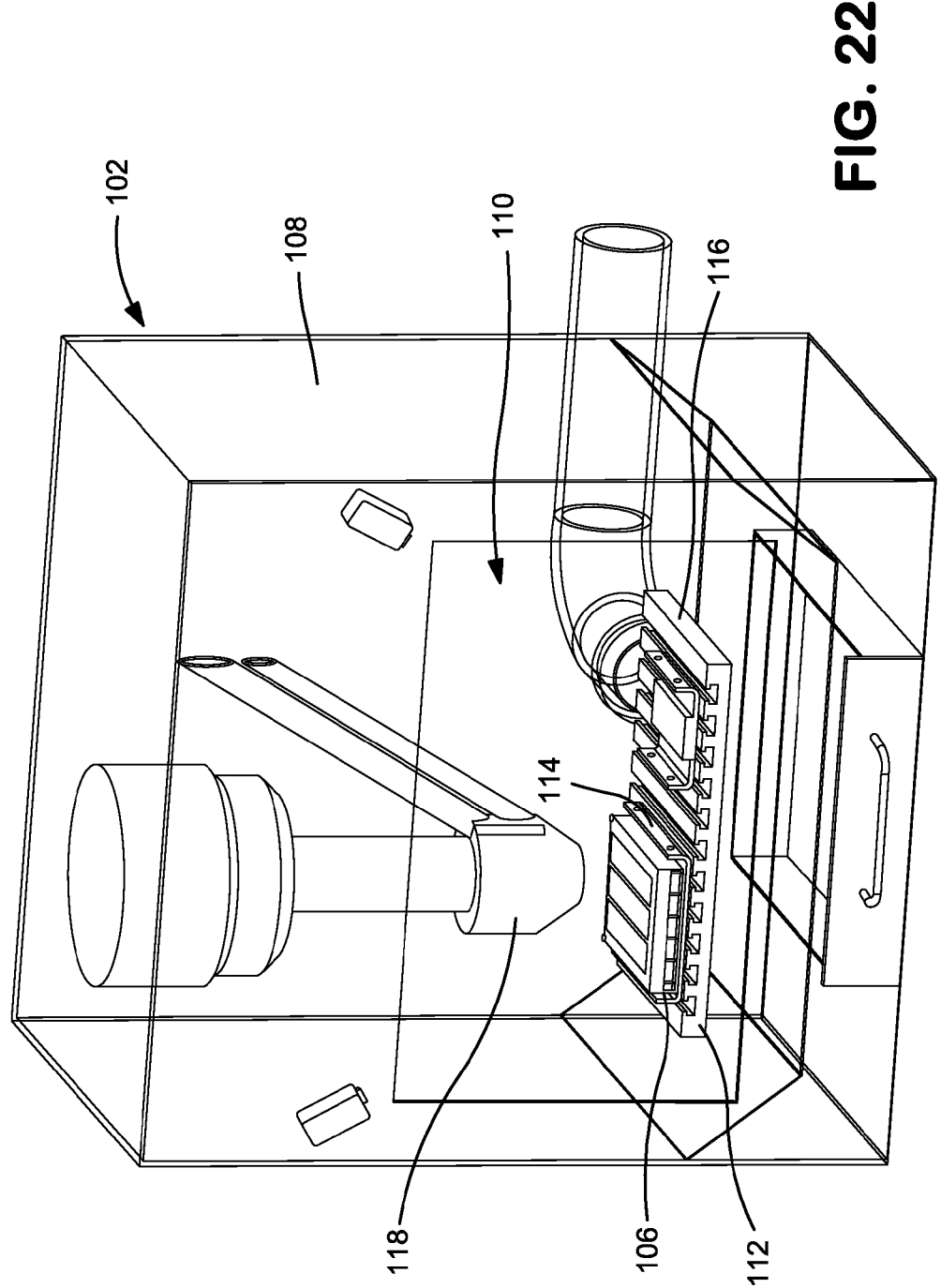
FIG. 22 is an isometric view of the laser hard drive data destroyer of FIG. 20 showing the loading table positioned in the body of the milling chamber.
Figure 23:
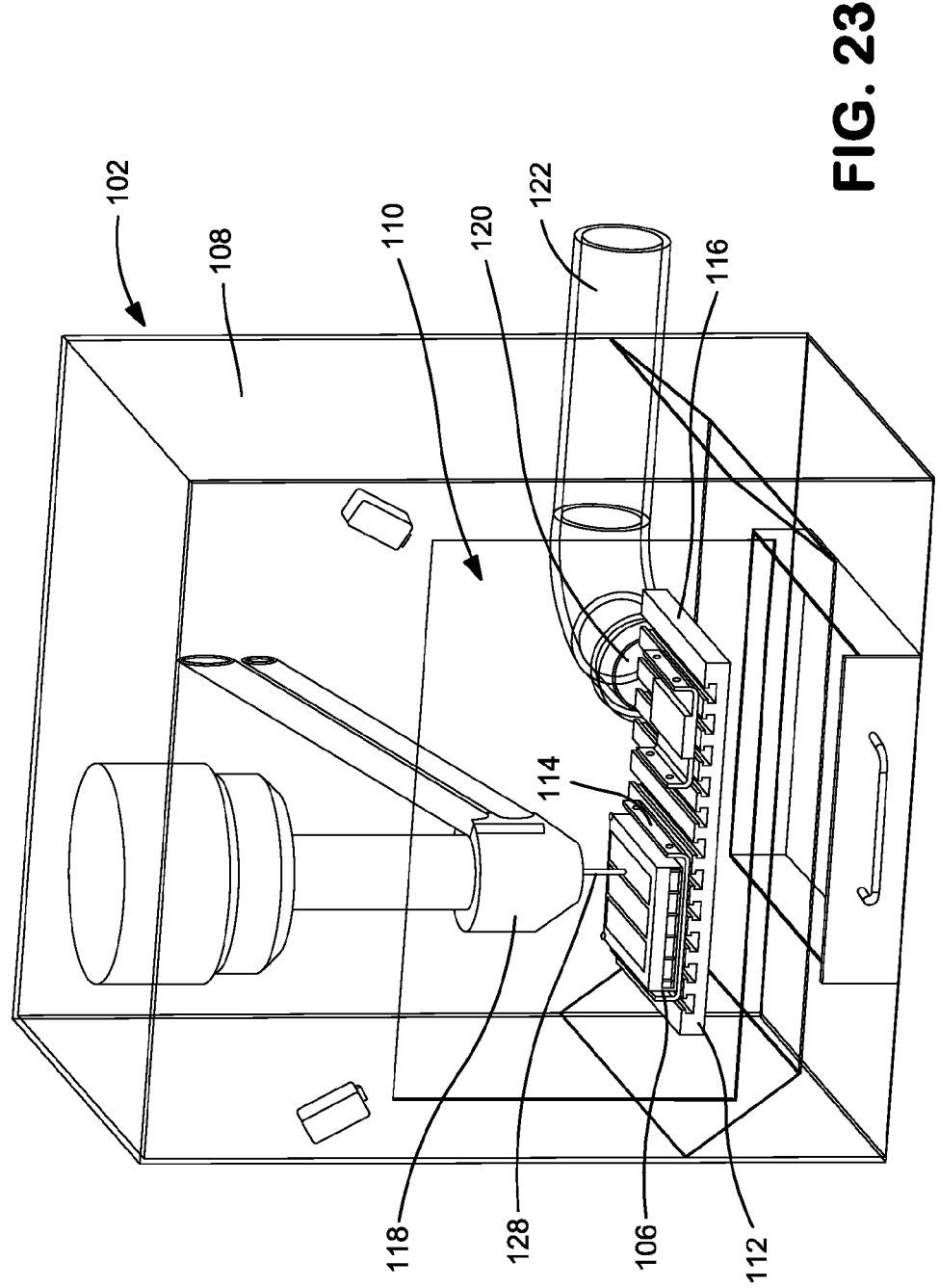
FIG. 23 is an isometric view of the laser hard drive data destroyer of FIG. 20 showing the laser acting on the hard drive.

Once the hard drive is placed in either the 3.5 or 2.5 inch holding cradle 114 or 116, and the servo-visioning system has identified the specific type of hard drive, the loading table 112 is automatically activated and moves inside the laser perforating chamber 110 as shown in FIGS. 16 and 22.

With the hard drive positioned in the laser perforating chamber 110, the laser head 118 then emits either a single or multiple laser beam(s) 128 in a pulsating manner, which bore through the outer casing of 3.5 or 2.5 inch HDD and SSD hard drive. The laser head 118 moves while the table 112 remains in a fixed position after it is introduced into the chamber. Alternatively, the table can move and the laser head can remain stationary. Based on the type of hard drive identified by the servo-visioning system, the laser system will emit a pulsating laser(s) that produce small round holes in a grid like pattern. The grid like patterns will correspond with the type of hard drive being destroyed, either a HDD 3.5 or 2.5 inch or SSD 3.5 or 2.5 inch drive.

Figure 28A:
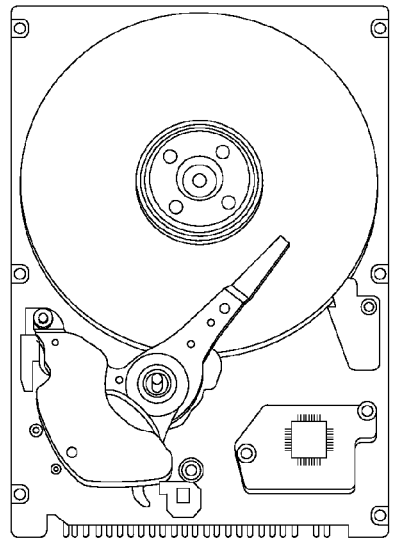
FIGS. 28a-28d are schematic plan views of an HDD and an SSD or HHD drive before and after the application of the laser.
Figure 28C:
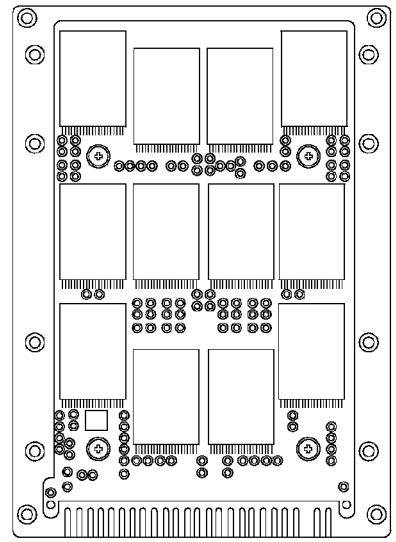
Figure 28B:
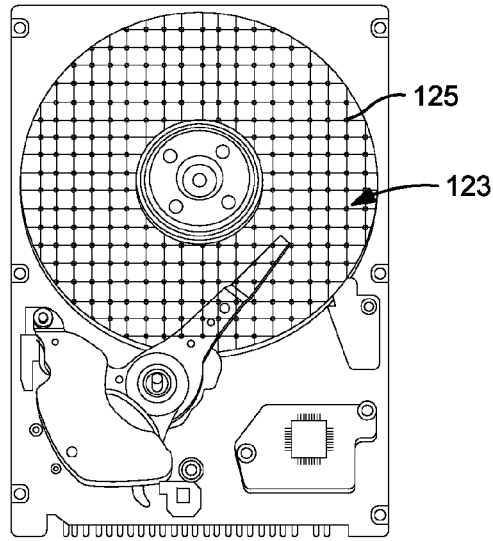
Figure 28D:
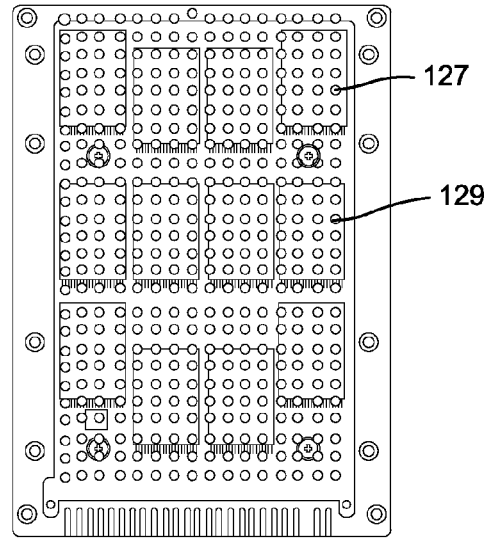
Figure 29:
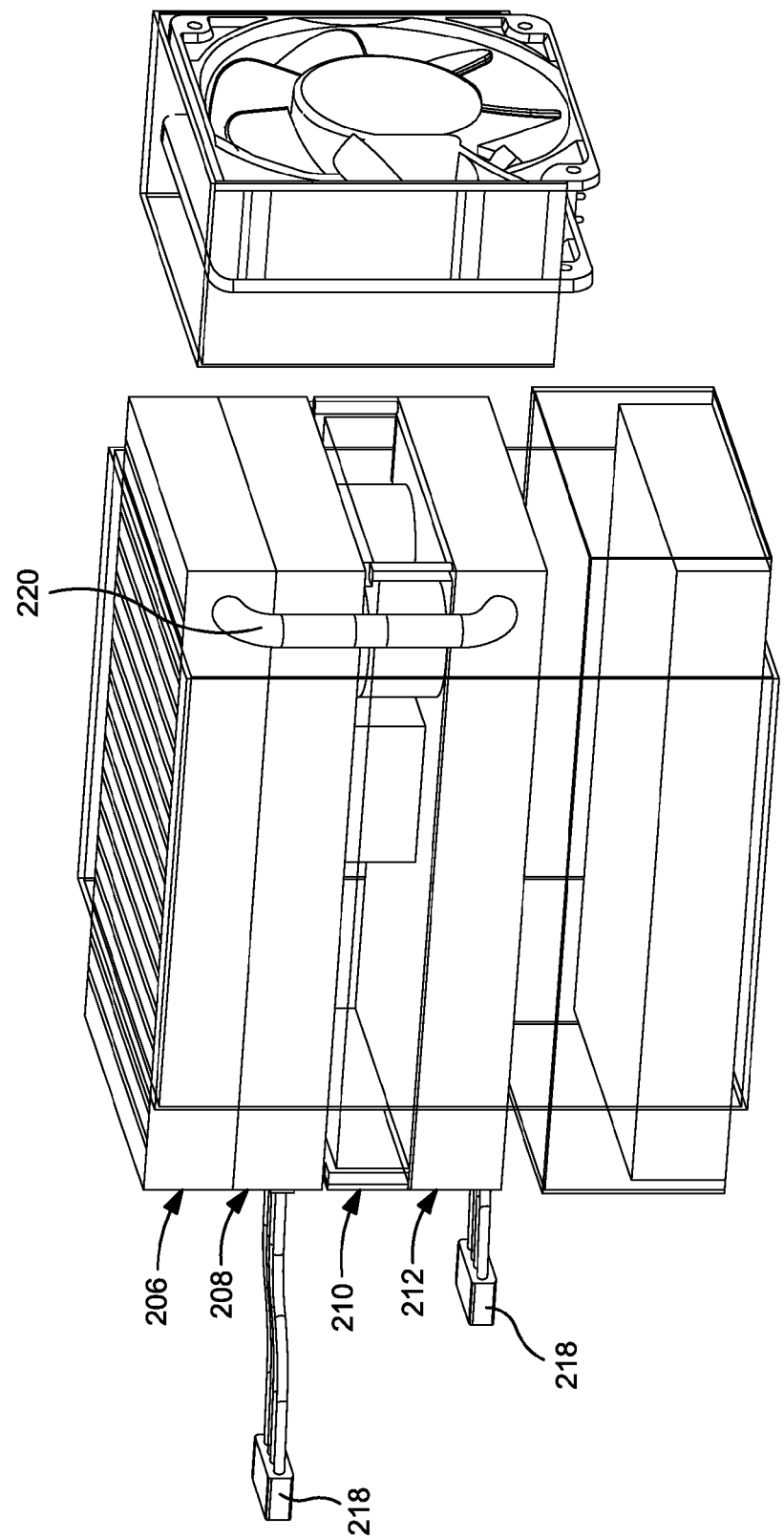
FIG. 29 is a schematic isometric view of a device for destroying hard drives using a spring-loaded chemical injecting system.
Figure 30:
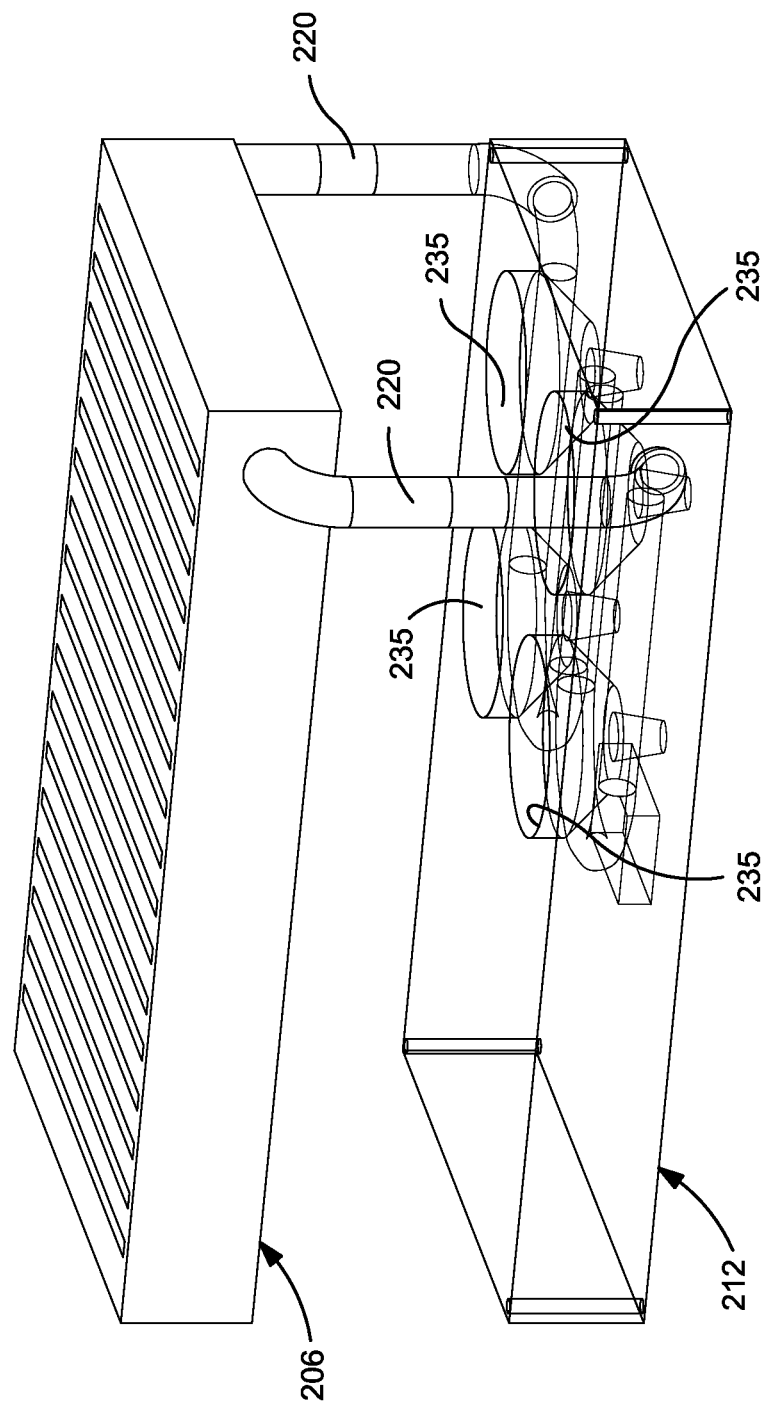
FIG. 30 is an isometric enlarged view of the radiator sub-assembly of the system of FIG. 29.
Figure 31:
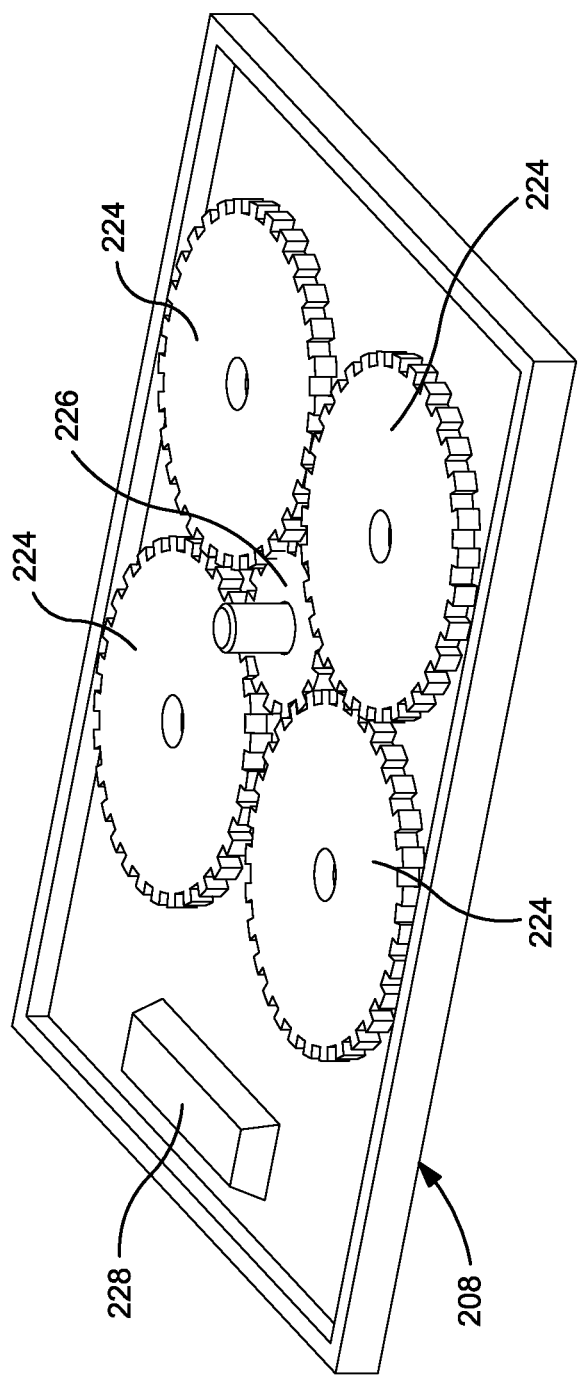
FIG. 31 is a isometric view of the cog sub-assembly of the system of FIG. 29.
Figure 32:
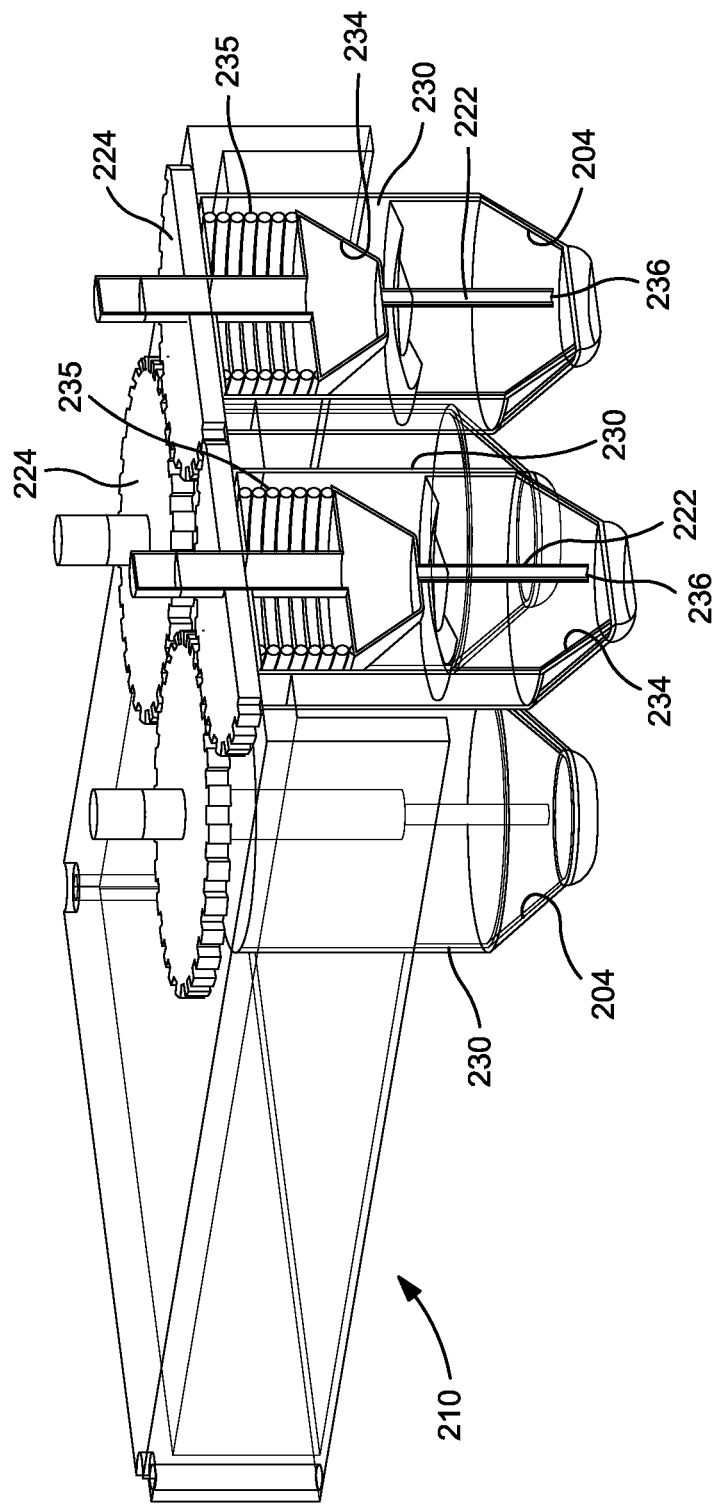
FIG. 32 is an isometric view of the device of the injector pin sub-assembly of the system of FIG. 29.

As shown in FIGS. 28a and 28b, which show schematically a HHD drive before and after the application of the laser respectively, the laser produces a round donut-shaped matrix 123 of small holes 125. FIGS. 28c and 28d show schematically the before and after results of the laser on a SSD and a HHD drive wherein the matrix 127 of small holes 129 is rectangular.

In addition to destroying hard drives, the laser perforation process can also be configured to destroy other forms of electronic media storage devices ranging from back-up tapes and DVDs to SIM cards.

Figure 18:
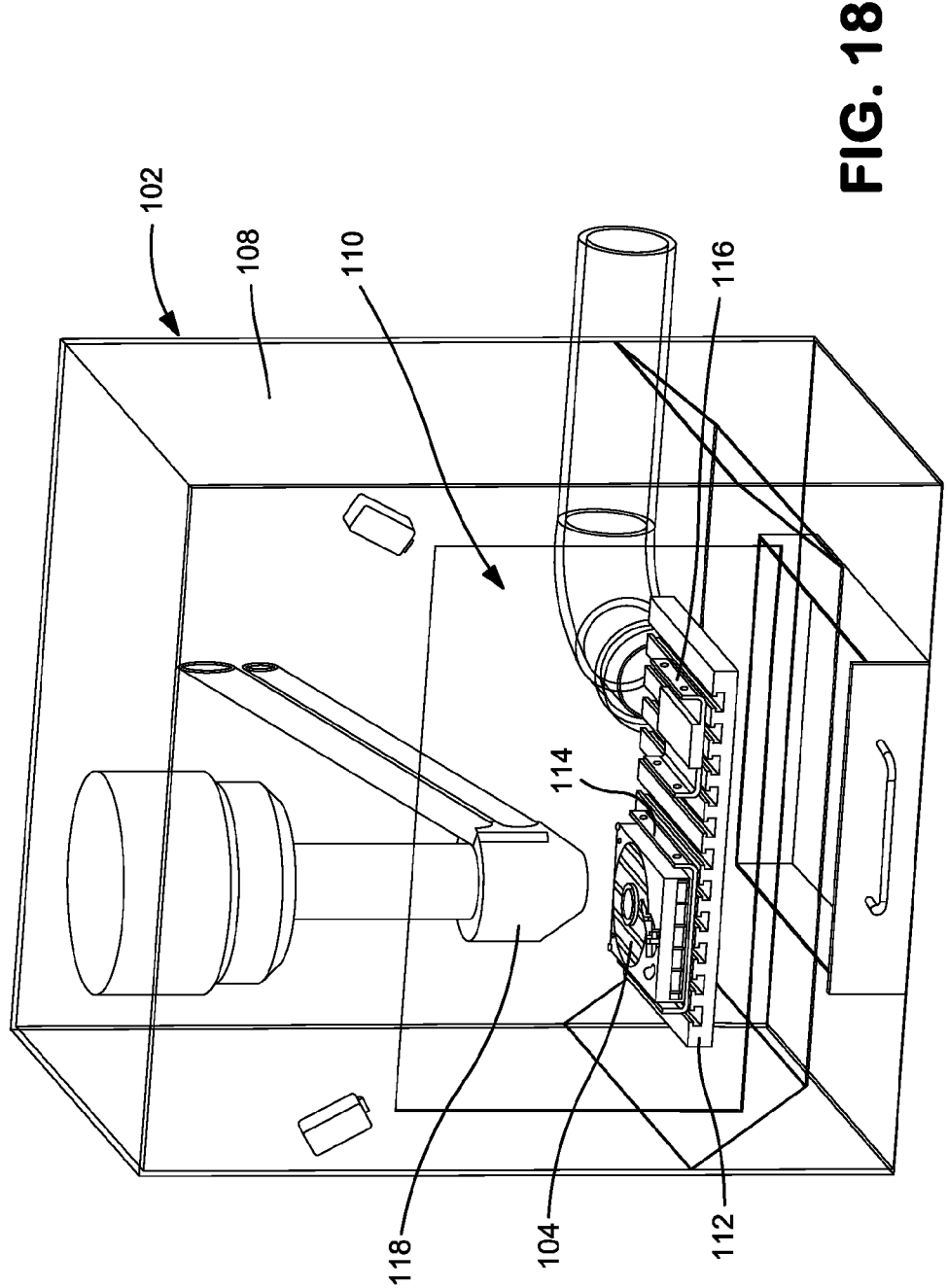
FIG. 18 is an isometric view of the laser hard drive data destroyer of FIG. 14 after completion of the laser perforation process.
Figure 24:
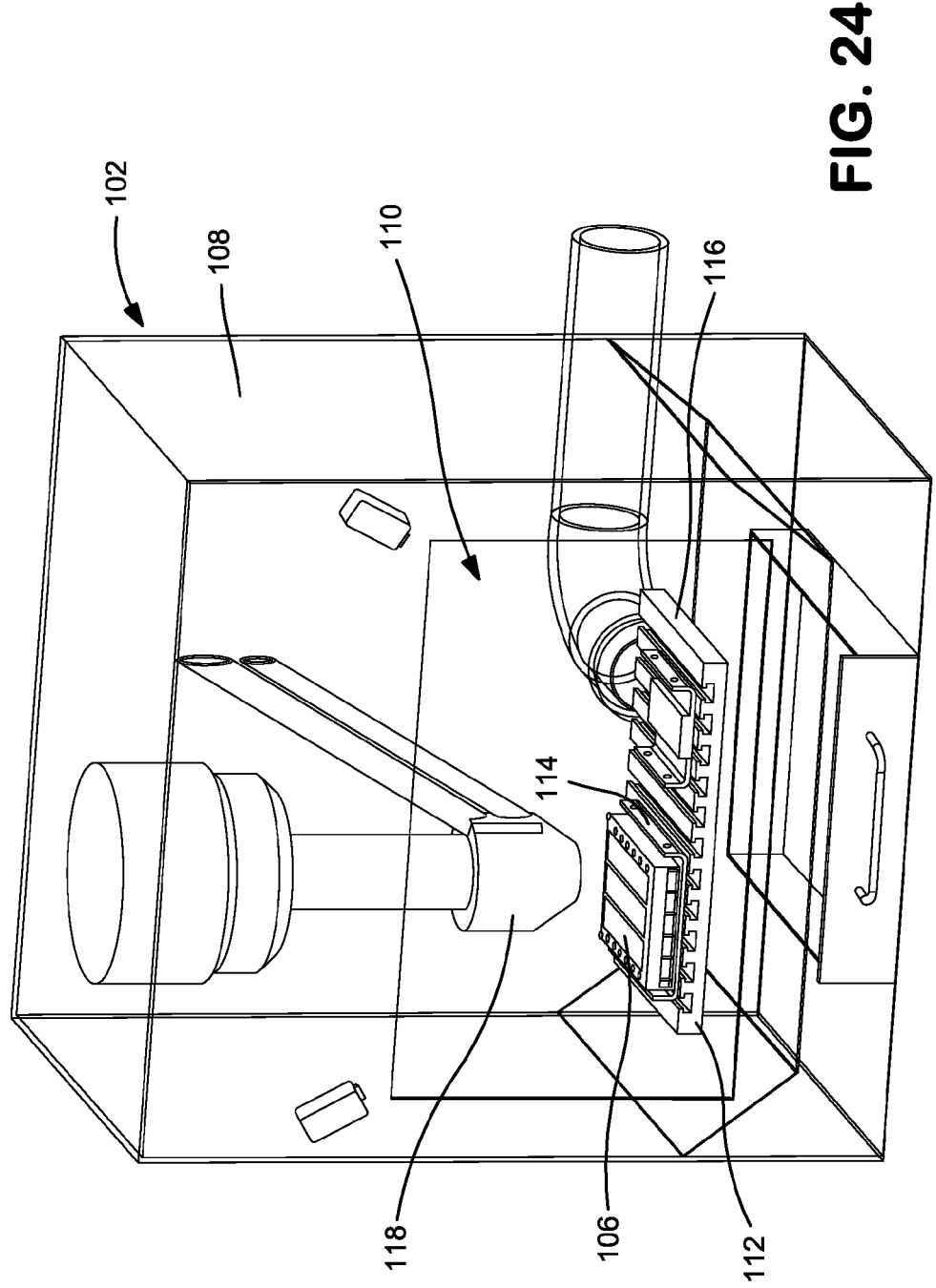
FIG. 24 is an isometric view of the laser hard drive data destroyer for SSD hard drives showing the destroyer in the loading position.

When the HDD laser perforation process is complete as shown in FIGS. 18 and 24 the exterior housing of the hard drive's surface is riddled with multiple holes that have penetrated the information platters of the hard drive in a grid like pattern that resembles a donut.

When the SSD laser perforation process is complete the exterior housing of the hard drive's surface is riddled with multiple holes that have penetrated the information pods of the hard drive in a rectangular grid like pattern.

Figure 19:
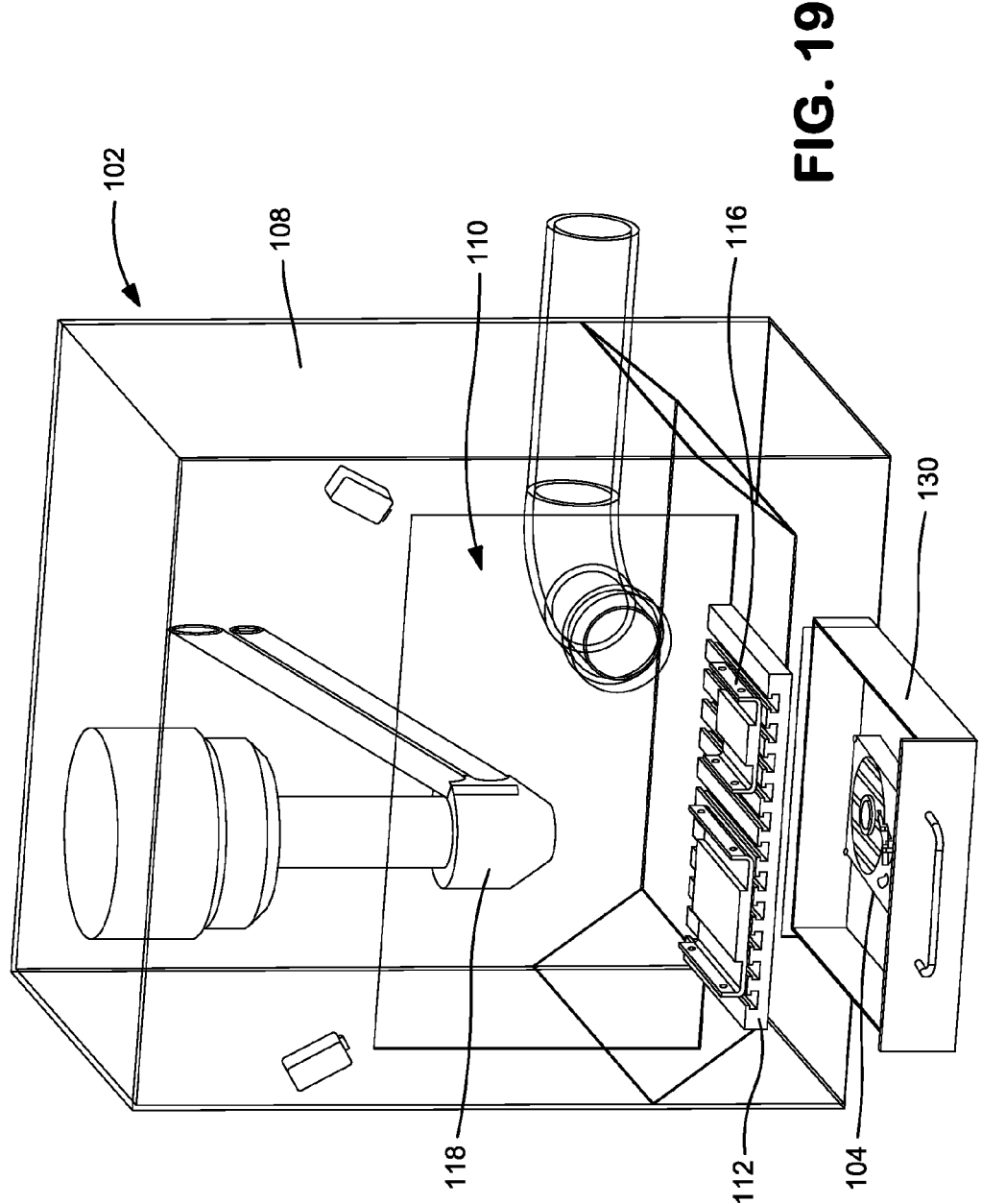
FIG. 19 is an isometric view of the laser hard drive data destroyer of FIG. 14 showing the laser hard drive data destroyer after the destroying operation is completed.
Figure 25:
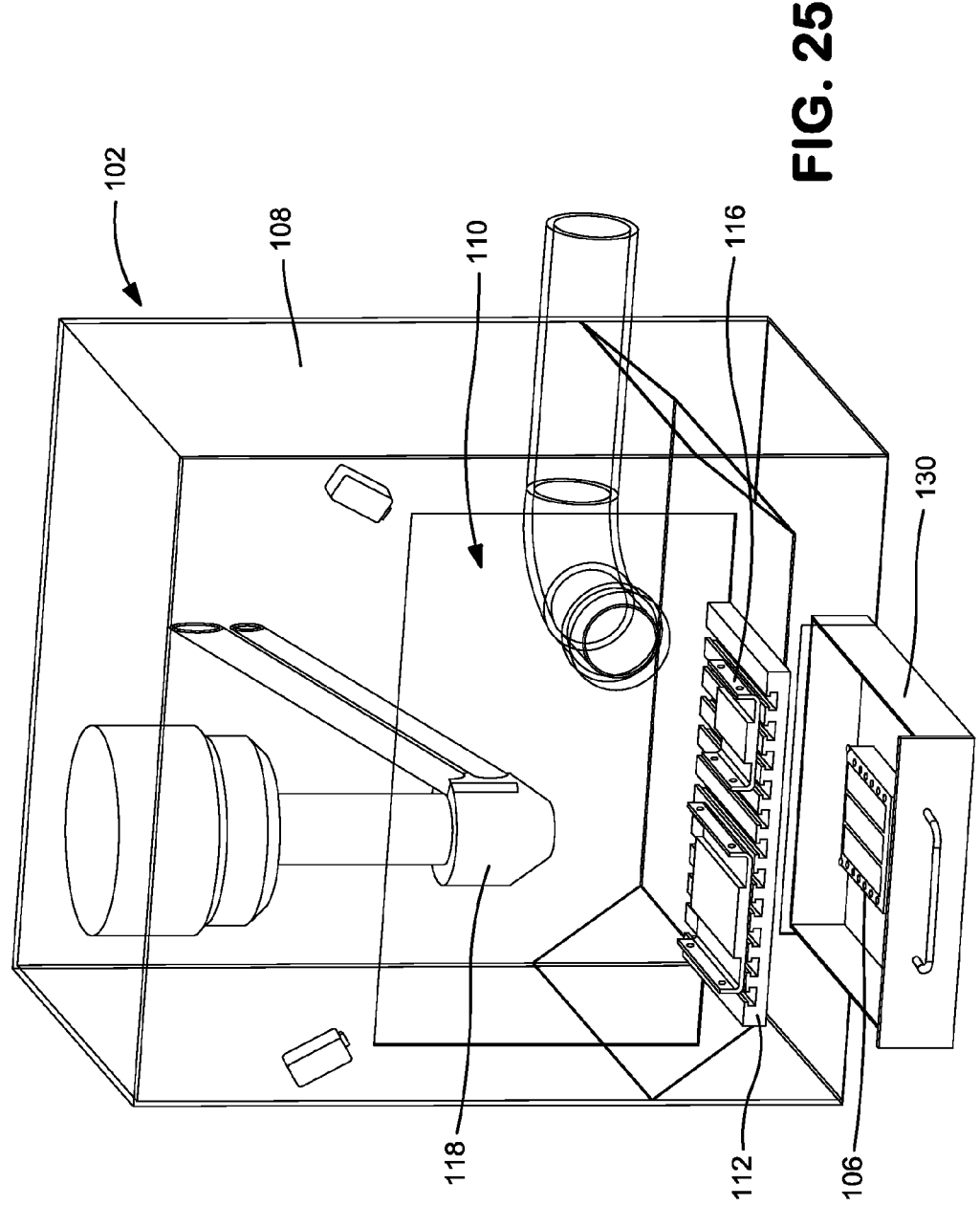
FIG. 25 is an isometric view of the laser hard drive data destroyer of FIG. 14 showing the laser hard drive data destroyer after the destroying operation is completed.

The vacuum system, including the exhaust port 120 communicating with the interior of the perforating chamber 110 and the exhaust pipe 122 and vacuum pump (not shown) is automatically activated during the laser perforation process to collect metal fragments that are produced and convey them to a collection bin (not shown). When the HDD or SSD laser perforation cycle is complete, the respective hard drive is automatically ejected from the holding chassis into the collection bin below the laser perforation chamber 110 to cool as shown in FIGS. 19 and 25. The loading table 112, with the empty holding cradles 114 and 116, exits the laser perforation chamber 110 to begin the next perforation cycle.

Figure 27:
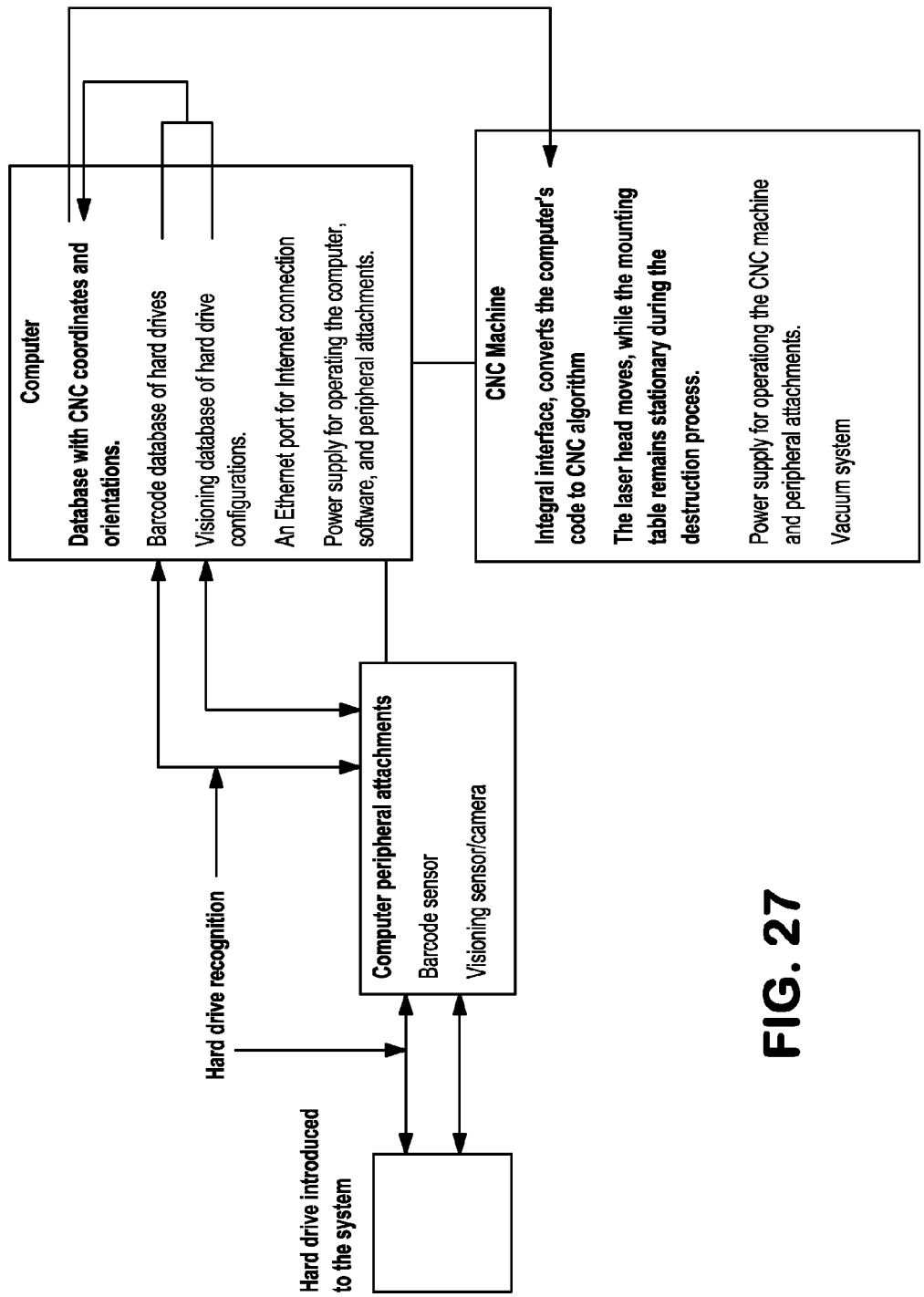
FIG. 27 is a block diagram of the FIG. 33 laser process of FIGS. 14-25.

The laser process system is schematically shown in the block diagram shown in FIG. 27. The hard drive on the cradle is scanned for recognition by the scanning system which may include a barcode sensor and a visioning sensor/camera. The information scanned is fed to the computer which has a data base for storing information about the hard drives. The computer converts the information about the hard drive in the cradle to a form to send to the CNC machine which controls the movement of the system. The computer may include an Ethernet port for connection to the internet along with a power supply for operating the computer, software and peripheral attachments.

A plurality of individual laser hard drive destroyers 102 may be provided, each at a separate location such as individual kiosks. The computer provides a means for the individual destroyers 102 to communicate with each other and/or with a centralized data base.

In the case of both milling systems shown in FIGS. 1-13 the laser system shown in FIGS. 14-25, the table 10 or 112 containing the hard drive may be moved rather than the miller cutter 18 or 20 or laser head 118, or a combination of movement.

FIGS. 29-35 show a chemical hard drive data destroying system 202. The system administers chemicals to destroy information imbedded on electronic media storage devices, such as hard disk drives (HDD), solid state drives (SSD), and hybrid hard drives (HHD), rendering the stored information digitally and forensically irretrievable.

The system 202 utilizes chemicals such as hydrochloric acid (HCL), ammonium nitrate (AN), and a solvent like water ($H_2O$) to erode and strip away the information imbedded on the platters and/or memory pods, circuit boards, contained within the body of the respective drives 203. An additional chemical such as polyurethane (PUR), polyol resin, or similar product, can be used as a foaming agent to aid in the disbursement of the chemicals and confine the dispersions within the cavity of the hard drive. Other chemical solvents may be used as long as they are capable of destroying the data storage portion of the hard drives. The chemical solvent should be any suitable solvent capable of dissolving the coating of the platter(s) of an HDD drive along with a portion of the platters. In the case of SSD hard drive, the chemical solvent should be able to completely dissolve the information pods. The chemicals used in the destruction process are stored in self-contained pods 204 that are constructed of natural and composite materials.

Figure 36:
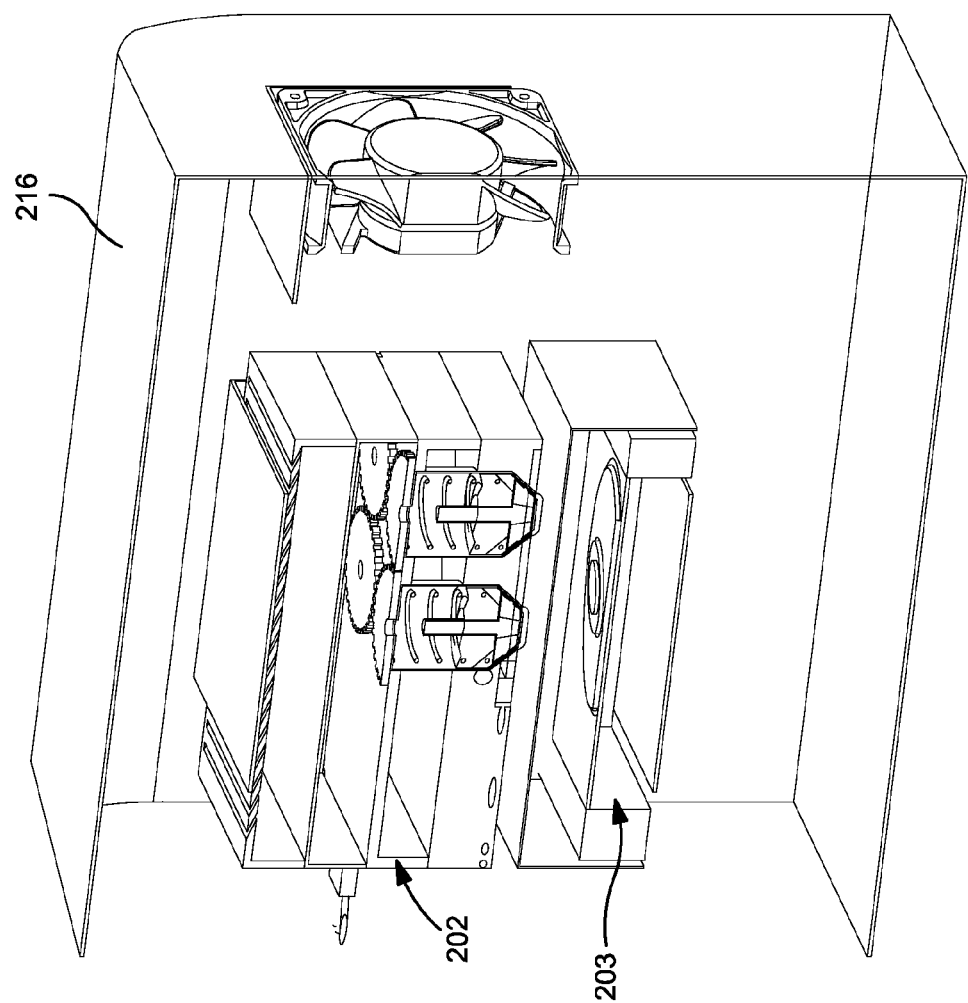
FIG. 36 is a schematic isometric view of a computer showing the placement of the system of Fig, 29 in the computer.
Figure 37:
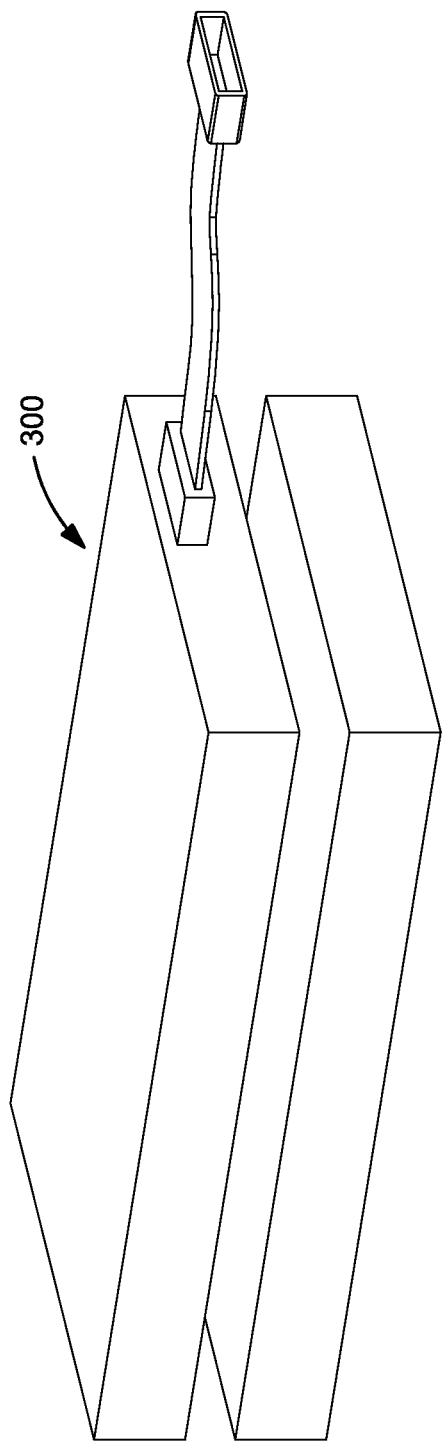
FIG. 37 is a schematic isometric view of a chemical injecting system for use with laptops.

The system 202 comprises several compartmentalized sub-assemblies: a radiator 206, a cog system 208, an injector pin system 210, and a temperature control plate 112, which includes a chemical sensor pad 214. The aftermarket hard drive destruction system 202 is positioned within the housing of the computer 216 customarily in the hard drive holding chassis; and mounted directly above the hard drive of the host computer as indicated in FIG. 36.

The sub-assemblies, which make-up the complete system, are stacked in descending order with the radiator 206 on top followed by the cog system 208, the injector pin system 210; and then the temperature control plate 112. However, the radiator can be placed in another vacant space within the computer housing to allow for more room in the hard drive holding chassis. Once installed, the system is interfaced with the mother board of the host computer through appropriate connectors 218 that allows the system to be activated by a key board onsite, or through remote access using the Internet. The hard drive is connected to the motherboard through its own wiring system.

When the system is activated, the radiator 206 which works in conjunction with the temperature control plate 214 circulates radiator fluid through a closed loop system including tubing 220 connected between the radiator 206 and temperature control plate 214 to maintain an ambient temperature for the stored chemicals. In some instances, the radiator does not have to be used if the host computer is deployed in an environment where the ambient temperature is compatible with the system's chemicals. Rather than a radiator fluid being circulated, air may be circulated.

The cog system 208 houses the drive mechanism that simultaneously drives the injector pins in the form of four hollow drill bits 222 through the chemical pods 204 stored in the temperature control plate 212, and into the cavity of the hard drive. The depth of the penetration of the drill bits 222 is pre-calibrated to the specific type of hard drive installed in the computer 216.

The cog system 208 includes four toothed cog wheels 224 operably connected one to each of the four drill bits 222. A center cog wheel 226 drives the cog wheels 224 and is driven by drive motor 228. The drill bits 222 are held above the chemical pods 204 until the system is activated.

The injector pin system 210 consists of four chambers 230 each with a spring loaded plunger 234 that drives the chemicals stored inside the chemical pods 204 through the hollow shafts of the drill bit 222, and into the cavity of the hard drive. The plungers 234 are held in their raised or cocked position against the bias of the spring 235 by a release mechanism (not shown). The chambers 230 are an open ended cylinder with the open bottom end disposed in the frustoconical openings 235 in the temperature control plate 212 in which the chemical pods 204 are located, While the drawings show four chambers 230, additional chambers 210 can be used to aid in the disbursement of the chemical solvent. In the case of the smaller 2.5 inch laptop hard drives, as few as one chamber may be utilized.

An auxiliary air system, using carbon dioxide ($CO_2$) cartridges or dedicated air line, can be integrated through the injector pin system 210 to assist with the chemical dispersion in the hard drive cavity. The injector pin system 210 can also be adapted to disburse chemicals that are stored outside the system, thus bypassing the use of chemical pods.

Figure 33:
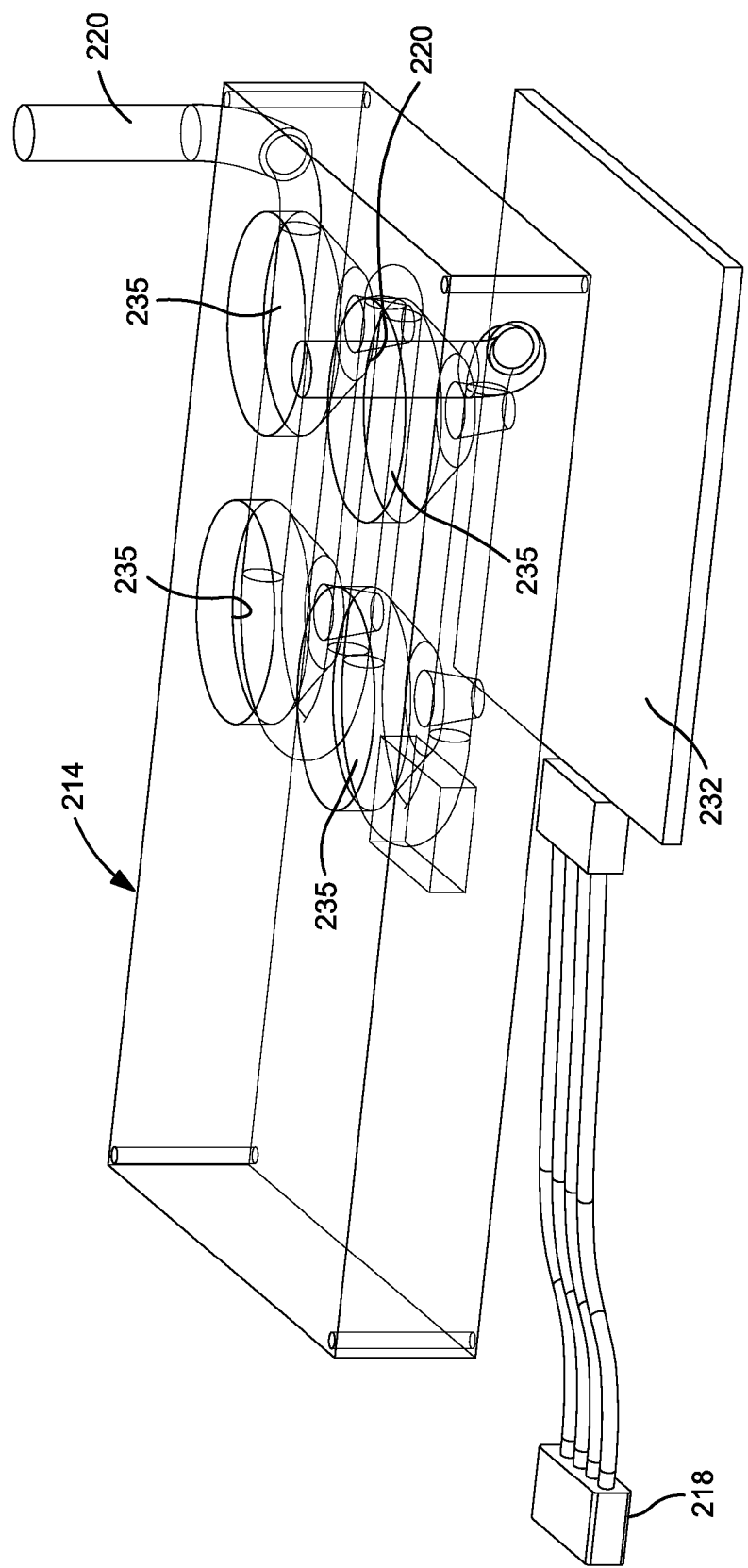
FIG. 33 is an isometric view of the temperature control plate sub-assembly of the system of device of FIG. 29.

The temperature control plate 214 houses the second half of the radiator's closed loop system, which is connected with external tubing 220. The tubing 220 extends around the exterior of the cog system 202 and the injector pin system 218 and extends through the temperature control plate 214 around the frustoconical openings 235 as shown in FIG. 33. The temperature control plate 214 also serves as the bottom portion of the four injector pin chambers 230, which house the four (4) conical shaped chemical pods. Threaded connecting rods (not shown) are used to securely fasten the injector pin system to the temperature control plate.

A chemical sensor pad 232 is attached to the bottom of the temperature control plate 214. The chemical sensor pad 232 serves to detect the premature release of chemicals as a safety precaution. The chemical sensor pad 232 may be connected to the mother board of the computer to provide a warning in the event of released chemicals.

With the system installed in the computer, the chemical system 202 is activated at the key board or from a remote location; both of which can be individually or collectively deactivated for additional security purposes. The drill bits 222 are activated and advanced against the hard drive 203 to pierce the body of the hard drive and enter the cavity in which the data storage portion is located. A release mechanism then releases the loaded spring(s) 235 which drives the plungers 234 downward against the chemical pods 204.

The process of the releasing the plungers 234 forces the chemical solvent out of the chemical pod 204 through holes in the tubular drills bits 22 and forces the chemical solvent through the pointed tip 236 of the drill bits 222 into the cavity of the hard drives. A single or multi step "bore and inject" method can be used to introduce the chemical solvent into the body of the hard drive.

Figure 34:
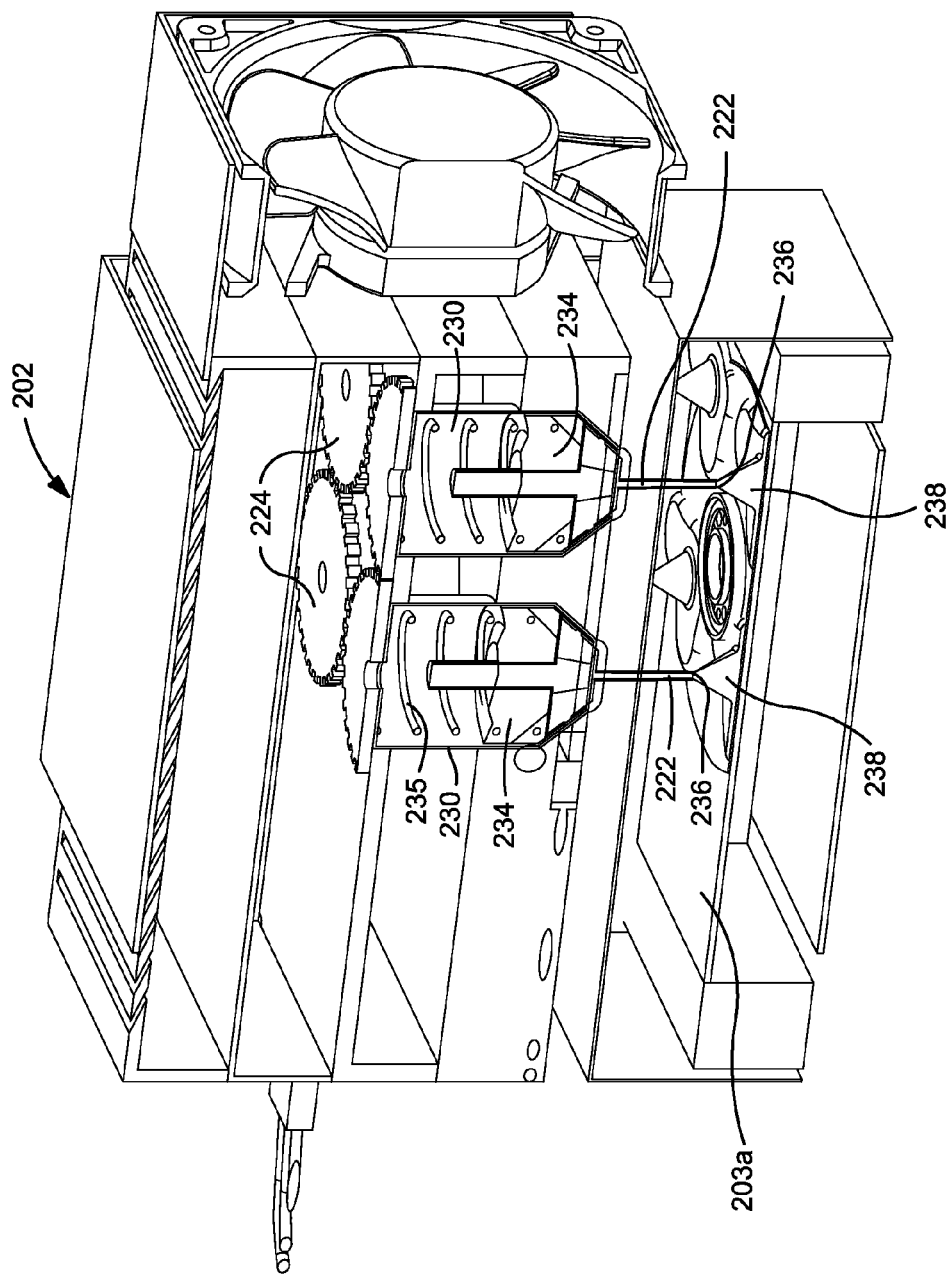
FIG. 34 is a isometric view of the system of FIG. 29 showing the injector pins released and the chemical flowing into an HHD hard drive.

Once the drills bits 222 pierce the body of the hard drive, the chemical solvent 238 begins to disburse from the drill tip 236 throughout the internal cavity of the hard drive. In the case of an HDD hard drive 203a as shown in FIG. 34, the platter(s) within the HDD hard drive will still be spinning, which aids in the disbursement of the chemical solvent coating the information platter(s). A foaming agent in the chemical solvent 238 will further aid in the disbursement of the chemical solvent 238 and restrict the disbursement within the cavity of the hard drive 203*a*. The expanding nature of the foaming agent will also serve as a seal to restrict the chemical solvent 238 from spreading outside the inner casing of the hard drive. The information stored in the HDD hard drive 203*a* is completely destroyed, but the computer can be used again by installing a new hard drive.

Figure 35:
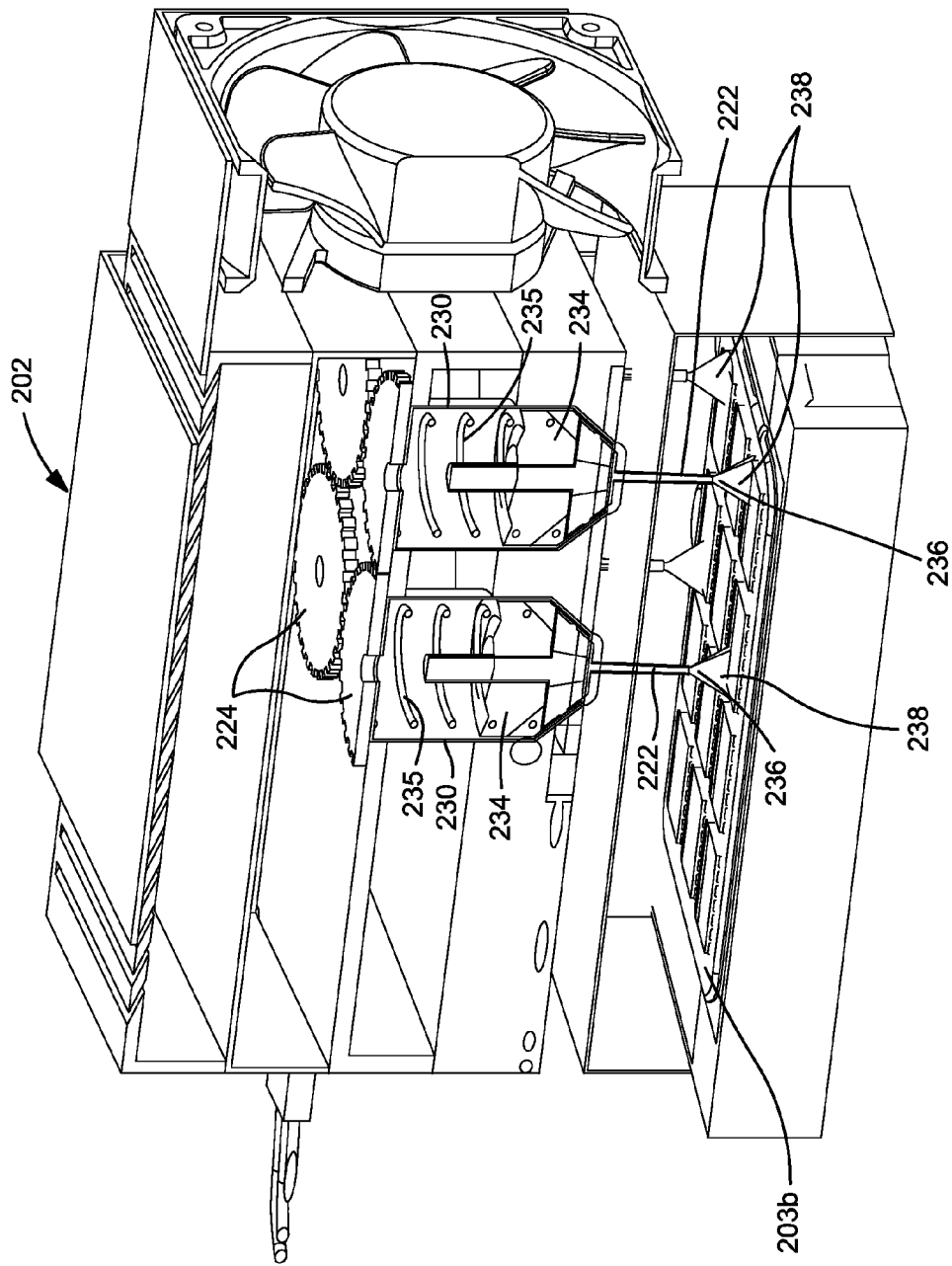
FIG. 35 is a isometric view of the system of FIG. 29 showing the injector pins released and the chemical flowing into an SSD hard drive.

In the case of SSD hard drives 203*b* as shown in FIG. 35, once the drill bits 222 pierce the body of the hard drive, the chemical solvent 238 begins to disburse throughout the internal cavity coating the information pods of the SSD hard drive 203*b*. A foaming agent may also be included in the chemical solvent to further aid in the disbursement of the chemical solvent and restrict the disbursement within the cavity of the hard drive. The information stored in the SSD hard drive 203*b* is completely destroyed, but the computer can be used again by installing a new hard drive.

Although the overall chemical destruction system is depicted for inside of the housing of a vertical computer, the sub-assemblies can be reconfigured to adapt to horizontal computer units with limited space above the hard drive.

FIG. 36 depicts the exterior of a smaller more compact spring loaded chemical data destroying system 300 for smaller 2.5 inch HDD and SSD hard drives such as used in laptops. As can be seen, the sub-assemblies are thinner than the counterparts previously described. Also, the chemical destruction system can be adapted to destroy other electronic media storage devices in smart phone, cell phones and tablets.

In the case of all three devices, the milling device, the laser device and the chemical device, the hard drives are processed with their covers remaining on. The covers have been shown removed in the drawings to differentiate the types of hard drives being processed. Additionally, the three devices may be designed for "desktop" use and utilize a standard 110 volt power source. However, more industrialized versions may utilize a 220 volt source. All three devices may be adapted to accommodate all types of electronic media storage devices.

What is claimed is:

1. A system for physically destroying the data storage portion of electronic media storage devices, the system comprising:
   a rotatable milling cutter,
   a nonrotatable cradle for locating the electronic media storage device in a position to engage the milling cutter, said cutter and/or said cradle being movable to permit the milling cutter to engage and remove the data storage portion of the electronic media storage device while leaving at least a portion of the remaining electronic media storage device intact;
   a computer containing a database of various parameters of different types of electronic media storage devices;
   an optical recognition system for determining the type of electronic media storage device being located via the cradle;
   wherein said determined type and said database are utilized to create numeric controller instructions for controlling relative translational movements of said cradle and said rotatable milling cutter while said rotatable milling cutter contacts the data storage portion for machining the data storage portion of the determined type of the electronic media storage device, such that for a first determined type of electronic media storage device, said relative translational movements between said cradle and said rotatable milling cutter are in a first direction along a longitudinal axis of the milling cutter to perform a coring operation on the electronic media storage device, and for a second determined type of electronic media storage device, said relative translational movements between said cradle and said rotatable milling cutter include, during machining of the data storage portion by the milling cutter, relative translational movements that are transverse to the first direction to perform a surface milling operation.

2. The system of claim 1, wherein the computer is an integrated computer.

3. The system of claim 1, further including:
   a cutting chamber in which the electronic media storage device is positioned for removal of the data storage portion; and
   a vacuum system to remove the destroyed particles from the chamber.

4. The system of claim 1, further including:
   a communications network, and
   wherein said computer includes:
      a port for an external modem accessing an internal modem; and
      an Ethernet cable for sending information between one or more systems.

5. The system of claim 1, further including:
   a cutting chamber,
   wherein said cradle is adapted to hold an electronic media storage device in said chamber,
   wherein said rotatable milling cutter is provided in said chamber for engagement with the electronic media storage device to destroy the data storage portion, and
   the system further comprising a non-rotatable spear coaxial with said milling cutter and contactable with said storage device to prevent rotation of said storage device while said rotating milling cutter is engaging said data storage portion.

6. The system of claim 5, further including a vacuum system to remove from the chamber destroyed particles produced by the machining of the data storage portion with the milling cutter.

7. The system of claim 5, wherein said first determined type of electronic media storage device includes a hub from which the data storage portion extends, and wherein said non-rotatable spear is engageable with said hub of the electronic media storage device to prevent rotation of the hub and data storage portion when said milling cutter is engaging the data storage portion.

8. The system of claim 1, further comprising an additional cradle and an additional rotatable milling cutter, each cradle having a respective one of the milling cutters associated with it.

9. The system of claim 1, wherein said optical recognition system comprises a scanning system to read information off of said storage device.

10. The system of claim 9 wherein said scanning system scans information including dimensional information, bar code, manufacturer, model, and serial number.

11. The system of claim 9 wherein said information scanned is used to position said cradle and said milling cutter.

12. The system of claim 1,
    wherein said first direction extends vertically.

13. The system of claim 1,
    wherein said second determined type of electronic media storage device is a solid state drive (SSD), and
    wherein said numeric controller instructions for controlling relative translational movements of said cradle and said rotatable milling cutter for machining the data storage portion for machining the second determined type of electronic media storage device include instructions for advancing said milling cutter in said first direction into said electronic media storage device, and
wherein said relative translational movements that are transverse to the first direction include movements that sweep said milling cutter across a surface of said electronic media storage device to destroy the area containing the data storage portion.

14. The system of claim 1, wherein said first determined type of electronic media storage device is a hard disk drive (HDD).

15. The system of claim 1, wherein said second determined type of electronic media storage device is a solid state drive (SSD).

16. The system of claim 1, wherein said determined type of electronic media storage is a third determined type, wherein said third determined type of electronic media storage device is a hybrid hard drive (HHD), and wherein the determined type and the database are utilized to create numeric controller instructions for controlling relative translational movements of said cradle and said rotatable cutter for machining the data storage portion of the third determined type.

\* \* \* \* \*